United States Patent
Greene et al.

(10) Patent No.: US 6,667,783 B2
(45) Date of Patent: Dec. 23, 2003

(54) CONSTRUCTION OF LARGE, ROBUST, MONOLITHIC AND MONOLITHIC-LIKE, AMLCD DISPLAYS WITH WIDE VIEW ANGLE

(75) Inventors: Raymond G. Greene, Endicott, NY (US); J. Peter Krusius, Ithaca, NY (US); Donald P. Seraphim, Vestal, NY (US); Dean W. Skinner, Vestal, NY (US)

(73) Assignee: Rainbow Displays, Inc., Endicott, NY (US)

(*) Notice: Subject to any disclaimer, the term of this patent is extended or adjusted under 35 U.S.C. 154(b) by 61 days.

(21) Appl. No.: 09/937,366

(22) PCT Filed: Jan. 19, 2001

(86) PCT No.: PCT/US01/01912

§ 371 (c)(1),
(2), (4) Date: Feb. 4, 2002

(87) PCT Pub. No.: WO01/53883

PCT Pub. Date: Jul. 26, 2001

(65) Prior Publication Data

US 2002/0154076 A1 Oct. 24, 2002

Related U.S. Application Data

(60) Provisional application No. 60/177,477, filed on Jan. 21, 2000.

(51) Int. Cl.$^7$ .................. G02F 1/133; G02F 1/1347; G02F 1/13; G09G 3/36

(52) U.S. Cl. .................. 349/73; 349/74; 349/75; 349/187; 345/88

(58) Field of Search ................. 349/73–75, 187; 345/88, 199, 903; 348/383

(56) References Cited

U.S. PATENT DOCUMENTS

| | | | | |
|---|---|---|---|---|
| 5,661,531 A | * | 8/1997 | Greene et al. | 349/73 |
| 5,668,569 A | * | 9/1997 | Greene et al. | 345/103 |
| 5,867,236 A | * | 2/1999 | Babuka et al. | 349/73 |
| 6,115,092 A | * | 9/2000 | Greene et al. | 349/74 |
| 6,181,392 B1 | * | 1/2001 | Greene et al. | 349/74 |
| 6,184,952 B1 | * | 2/2001 | Greene et al. | 349/74 |
| 6,184,953 B1 | * | 2/2001 | Greene et al. | 349/74 |
| 6,188,454 B1 | * | 2/2001 | Greene et al. | 349/74 |

* cited by examiner

Primary Examiner—Tarifur R. Chowdhury
(74) Attorney, Agent, or Firm—Salzman & Levy; David L. Banner

(57) ABSTRACT

The present invention features a series of techniques for designing and assembling of large, robust monolithic and monolithic-like flat panel displays. Many techniques originally developed for creating tiled, flat-panel displays having visually imperceptible seams may be advantageously applied to monolithic structures. These techniques include single-sided wiring, two-sided wiring from opposite sides, segmented row and column lines, and reordering row and column lines in fan-out region. Single-sided wiring facilitates the construction of displays with small outlines. By using these techniques, display sharpness and contrast may be improved. In addition, color and luminance balance and uniformity across the display may also be improved.

45 Claims, 40 Drawing Sheets

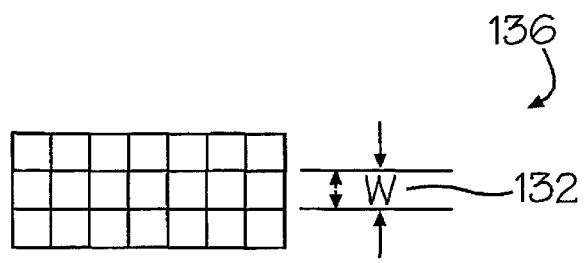
(a) Square
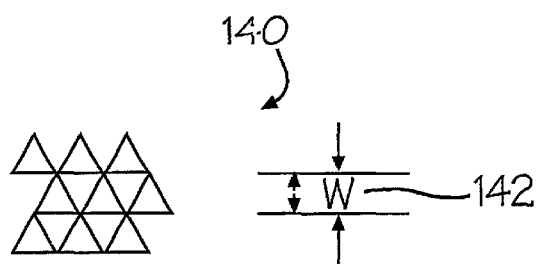
(b) Triangular
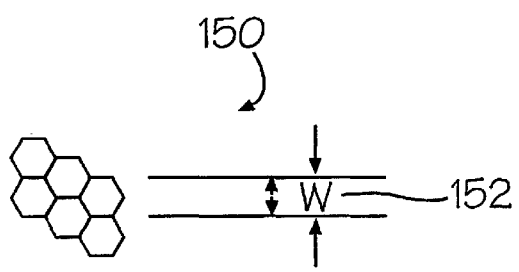
(b) Hexagonal
*Figure 3*

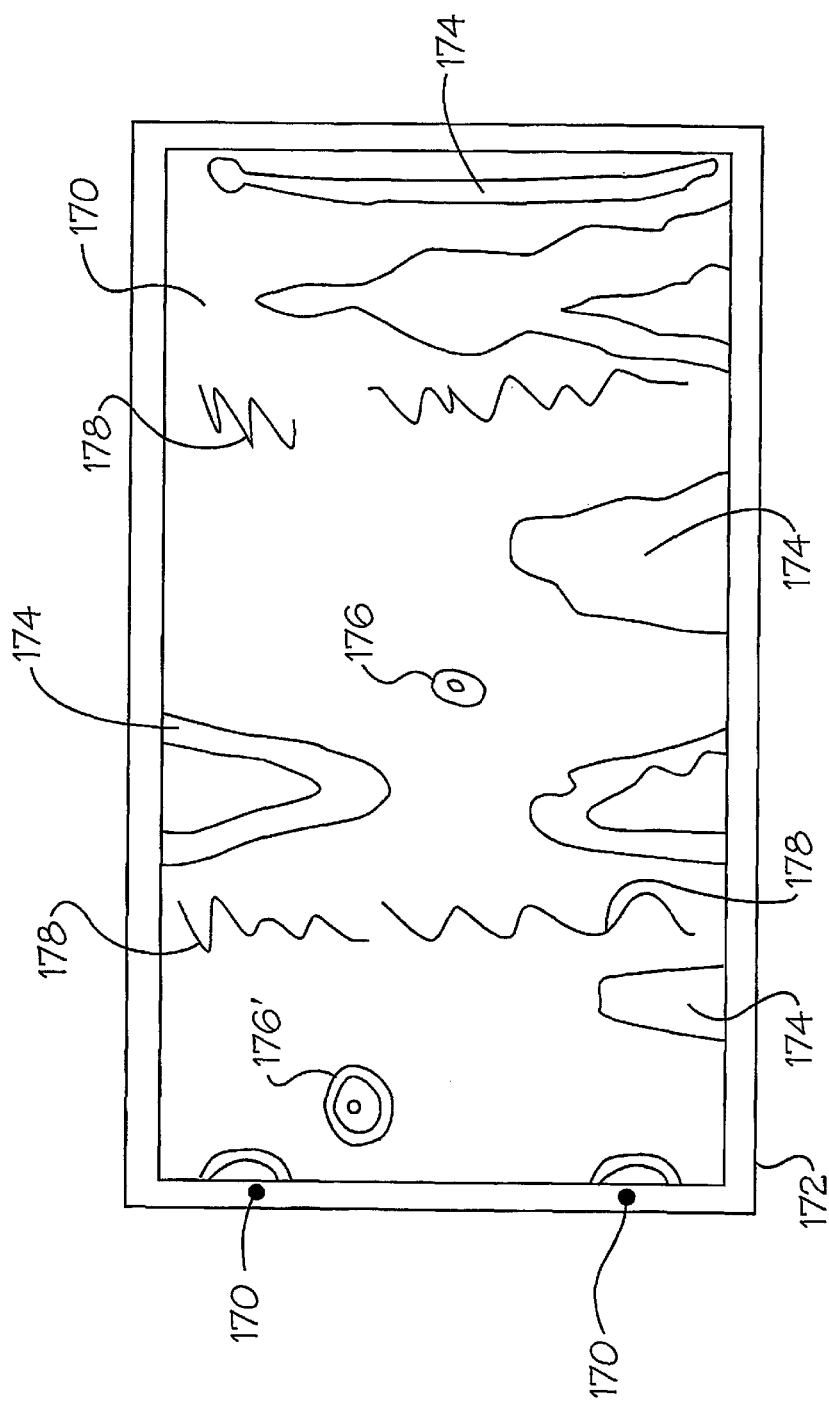

Access Side

CONSTRUCTION OF LARGE, ROBUST, MONOLITHIC AND MONOLITHIC-LIKE, AMLCD DISPLAYS WITH WIDE VIEW ANGLE

RELATED APPLICATIONS

This application is a Continuation-in-Part of U.S. Provisional Application Serial No. 60/177,477, filed Jan. 21, 2000.

RELATED APPLICATION

The present invention is related to copending U.S. patent applications: Ser. No. 09/024,481, filed Feb. 17, 1998; Ser. No. 09/396,142, filed Sep. 15, 1999; Ser. No. 60/153,962, filed Sep. 15, 1999 (now replaced by Ser. No. 09/490,776, filed Jan. 24, 2000); Ser. No. 09/322,047, filed May 28, 1999; Ser. No. 09/461,060 filed May 28, 1999, all of which are hereby incorporated by reference. It is also related to issued U.S. Pat. Nos. 5,661,531, 5,668,569, 5,889,568, 5,867,236 and 6,020,868 which are commonly assigned to the assignee of the instant application, all of which are also hereby incorporated by reference.

FIELD OF THE INVENTION

This invention pertains to the design and manufacture of large, flat-panel electronic displays and, more particularly, to the manufacture of active matrix liquid crystal display (AMLCD) type, flat-panel displays assembled in a single monolithic or monolithic-like assembly, strengthened for structural integrity, corrected for brightness and hue variations due to optical or electro-optical aberrations and structural non-uniformities, equipped with lighting means and optical means that provide large view angles while improving visual acuity and contrast, and thin film wiring in the display that is uniquely designed to avoid or compensate for non-uniformities in pixel response, brightness, and chromaticity.

BACKGROUND OF THE INVENTION

Large displays can be constructed using several established display technologies, including cathode ray tubes (CRT) and projectors of the rear view type. However, as the diagonal size of these displays increases their volume and weight increase significantly. Further, manufacturing becomes more difficult while the manufacturing cost greatly increases.

An alternative approach to implementing large direct-view displays is provided by flat-panel displays, which offer a much reduced thickness and weight. The active-matrix liquid-crystal display (AMLCD) is the most mature of these technologies. The structure of an AMLCD consists of a liquid crystal (LC) layer sandwiched between two thin glass plates with a thickness typically of 0.5 mm, 0.7 mm, or 1.1 mm. As the diagonal size of the AMLCD increases above about 20 inches, the structural integrity of the sandwich becomes insufficient; hence the mechanical assembly should be strengthened for larger sizes. At the same time, non-uniformities arising from manufacturing and operation dramatically increase and the manufacturing yield decreases.

Today's AMLCD displays have several additional drawbacks in consumer applications. In particular, the view angles are limited to values much smaller than those of the CRT. In addition, the brightness-energy efficiency is reduced by polarizers, light collimator means, and any screens used to enhance the view angles. If such direct-view AMLCDs are to compete with CRTs in consumer applications, these deficiencies must be overcome.

Recent improvements in display technologies, as disclosed in the above related patents and patent applications, have been made to overcome these deficiencies or compensate for them in large tiled AMLCDs, in which the display is assembled from several smaller, independently fabricated pieces or tiles. Many of these improvements can also be applied to large monolithic displays. These improvements can help improve the characteristics of a monolithic or monolithic-like display or compensate for artifacts resulting from imperfect manufacturing of the components or their assembly. However the substantial structural differences between monolithic and tiled displays must be considered, when the new techniques are applied to monolithic ones.

Unlike tiled displays, monolithic displays have no structural discontinuities in the seams between adjacent tiles, a fact that substantially relaxes light collimation requirements, one of the key techniques used to hide the seams in tiled displays. As a consequence, the useable aperture ratio increases, screen specifications are altered, and the need for masks decreases. Therefore, the design of the optical stack and lighting in large monolithic or monolithic-like displays is significantly different compared to large, tiled AMLCD displays.

The present invention reflects unique designs and methods for fabricating or operating large monolithic or monolithic-like AMLCDs of both color and gray-scale types using many of the techniques developed for large, tiled, flat-panel displays (FPDs). Although this specification describes most of the techniques and methods in the context of AMLCDs, many of them can be applied to other transparent, light-valve type FPDs. Characteristic of such displays is that light from a uniform, back light source is transmitted through the display assembly towards the viewer located on the front side. The light valves control the amount of primary light rays transmitted through the apertures of sub-pixels. The transmitted light from the sub-pixels mixes to form all desired brightness and hue combinations (color space) before it reaches the viewer located at a predefined viewing distance from the display. The techniques and methods transferred from tiled to large-scale, monolithic, flat-panel displays, augmented with other methods described herein, significantly improve the performance of the latter, including viewing angle, image acuity, contrast, and color uniformity. At the same time, these unique design improvements can be used to increase the manufacturing yield, compensate for imperfections of arising from the fabrication and assembly of the display, and transform the fragile, large, monolithic display into a robust laminate between glass cover plates and back plates.

Robust display glass laminates can be made using adhesive films with a preferred thickness in the range from 25 to 250 $\mu$m or thicker, and optimized in compliance. The monolithic display panel, for example, can be laminated between glass cover and back plates without stressing the birefringent AMLCD glass or deforming the LC cell gap. U.S. Pat. No. 5,867,236 "CONSTRUCTION AND SEALING OF TILED FLAT-PANEL DISPLAYS", coponding U.S. patent application Ser. No. 09/490,776 and U.S. patent application Ser. Nos. 09/368,921 and 09/369,465, show laminate structures that accomplish the desired result. Laminate structures for a prototype 800×600 SVGA 38.6" diagonal tiled display are also shown in copending patent application Ser. No. 09/368,921. A method for processing large display laminates is discussed in copending patent application Ser. No. 09/322,047 and U.S. Pat. No. 6,097,455.

The laminate is designed with a symmetry about the image creation plane in the AMLCD glass sandwich (LC layer), which contains the weakest link to shear or bending. This link is formed by a narrow adhesive seal, typically about 5 $\mu$m thick, that joins the thin-film-transistor (TFT) substrate to the color-filter (CF) substrate around the perimeter of the display. The width of this seal may be as narrow as 1 mm or less, and it may be the only mechanical link, other than surface tension of the LC liquid layer, that holds the substrates together during handling, assembly, and field use induced stresses.

An external full face seal material, in dry film form, or a layered combination with dry film, or liquid film alone, of a preferred thickness range and preferred elastic compliance, is used to bond the robust glass cover and back plates on both sides of the AMLCD sandwich to increase the bending strength. This preferred design provides a substantially increased resistance to bending, thereby decreasing the effect of any unintentional stresses exerted on the narrow seal. The preferred thickness of the adhesive films between cover and back plates and the AMLCD sandwich are dependent on whether a mask is used on the back plate to set the light collimation angles. The relationships of these angles are shown in detail in the aforementioned patent applications.

Since such aperture masks are not needed on the back plate to direct light rays away from the seams in monolithic displays, as in tiled ones, the thickness requirement for the adhesive may be relaxed for the monolithic display laminates. Aperture masks on the cover and back plates may still be desirable in monolithic displays to optimize the visual acuity and contrast of displayed images. Alternatively, they may be removed from the display stack, if other light collimation means are preferred.

The air is controllably purged at the meniscus of the full face adhesive interface between cover and back plates and the AMLCD sandwich so that no bubble-type defects are introduced in these laminate structures during assembly. Techniques for achieving bubble free laminate assemblies for attaching the compliant adhesive films to monolithic displays, have been described in copending copemding patent application Ser. No. 09/322,047 and U.S. Pat. No. 6,097,455.

Back or cover plates may be made of standard glass, such as Corning 1737, that is commonly used in the AMLCD industry. Today's glass sheet thicknesses have been standardized to 0.5, 0.7 and 1.1 mm. Any of these glass thicknesses may be used in display assembly lamination as cover and back plates. Smaller glass thicknesses allow a smaller radius to be used in an adhesive extrusion process as described in U.S. Pat. No. 6,097,455. This translates into a smaller probability for trapping bubble defects. Lamination between glass cover and back plates produces a robust assembly with a constant refractive index and well matched thermal expansion characteristics compared to the conventional display glass substrates. Although robustness is improved by increasing the cross-sectional inertia to bending stresses, it is also important to maintain the neutral axis in the LC image plane, in which the epoxy seal joins TFT and CF substrates. This can be accomplished by making the thickness of the adhesive films equal between the cover and back plates and the AMLCD sandwich. For this reason, the laminate is designed to be approximately symmetrical around the LC plane. Consequently, the thickness of both the glass cover and the plates is chosen to be approximately 1.1 mm or greater.

The transparent regions in the sub-pixel compared the total area of the pixel (ratio defined as aperture ratio) are substantially larger in monolithic AMLCDs (60–80%) compared with tiled displays (30–50%) due to the space required by the seams and tiling functions as described in patent application Serial No. 60/177,448.

The viewing angles in monolithic AMLCDs are generally not as wide as desired. The image acuity is highly dependent on the back light, which is normally diffuse. One published method under development for improving the viewing angles is discussed in Information Display Magazine, February 1999 by Joel Pollock, "Sharp Microelectronics' Approach to New-Generation AMLCDs". Even though in-plane switching, as discussed in this reference, has drawbacks, including slower response times, this technology is gaining favor because there is no other fully developed method to meet the wide view angle requirement for consumer TV applications. This innovation is currently not available in products. As a consequence, there are no AMLCD products with both good video response and satisfactory view angles for consumer TV applications. The inventions disclosed in this patent application, appropriately adapted from tiled displays, overcome this limitation.

An excellent video response with good view angles has been demonstrated in prototype tiled, SVGA resolution, AMLCDs with a seamless appearance. The underlying designs have been described in copending patent application Ser. Nos. 09/490,776 and 09/368,921. The view angle distribution has been achieved by a combination of techniques that includes the use of highly collimated light with a sharp cut off angle together with a screen above the cover plate. The screen diffuses the highly collimated light rays outwardly, forming the desired viewing angle distribution. It therefore provides excellent brightness and hue within a view angle envelope as large as 160–170°.

One drawback to the approach used for tiled displays is that a large fraction of the light is lost in the light collimation process. The mask on the supporting back plate and the collimation mechanisms within the light box introduce the largest losses. The screen absorbs or reflects light, depending on its material components and refractive index at its interfaces. Despite these effects, improvements in light collection and recirculating technology have made it possible to predict that standard and high definition TV (SDTV and HDTV, respectively) 40" display products with a brightness of 300 cd/m$^2$ are possible at power levels of 300 W. Therefore, these same techniques may also be applied to monolithic AMLCDs. The brightness-power efficiency in monolithic displays is enhanced further because of their larger aperture ratios and less severe light collimation requirements. Finally, less light is lost in brightness and color matching in monolithic displays compared to tiled ones, from the application of software and electronics based corrections disclosed in copending patent application Ser. No. 09/396,142 for tiled displays.

Monolithic flat-panel displays made in accordance with known liquid crystal display (LCD) technologies for applications in portable computers (notebook) and desktop monitors are limited in size, due to manufacturing yields and cost. This limitation arises partly from the trend towards ever higher resolutions, rather than optimizing the designs and manufacturing of inexpensive, larger, consumer TV displays with diagonal sizes between 20 and 50". Assembly tolerance requirements for tiled displays are stringent and will become more severe with the reduced size of the displays. The practical range of sizes for tiled displays at acceptable resolutions is currently estimated to be at about 30" or larger. Thus the range of interest for application of direct view monolithic AMLCDs to consumer TVs spans from less than 20" to about 30". Monolithic display sizes much beyond 30" are likely to be too expensive for mass production. At such sizes they will be in direct competition with projection displays, direct view plasma FPDs, and tiled AMLCD FPDs.

In this patent application, digital flat-panel TVs in the 24 to 40" size range with resolutions from SDTV (480 lines) to HDTV (720 or 1080 lines) are chosen as illustrations for the preferred inventive design elements.

The desired lighting collimation technology for such displays is similar to that disclosed copending patent application Ser. No. 09/024,481. However, the cut-off angles for the light collimation can be substantially relaxed. In contrast, in tiled displays only about 1% of the light is allowed to escape beyond the cut-off collimation angles. Therefore, a unique light collimator design optimized for a much higher brightness-power efficiency is herein described for monolithic displays.

The majority of today's liquid crystal display modules is digitally controlled. An optical transmission-drive voltage relationship (T-V curve) determines luminance of each sub-pixel light valve via the discretized voltage across the pixel, the LC cell in an AMLCD. Color is produced by having the light rays pass through color filter layers placed on top of the sub-pixel apertures. Three separate color filters for the red, green and blue (RGB) primary colors are the most common choice. Additive mixing of the primaries, properly weighted, produces all brightness and hue combinations in the color space. Unless otherwise noted, the. T-V curve for each sub-pixel is here considered to be an effective relationship that includes the entire display system response from the electronic drive signal to the resulting luminance.

In large, tiled, liquid crystal displays, small relative placement variations of the AMLCD tiles with respect to external reference layers (f or example, masks on the cover plate) result in changes in brightness and hue of the pixels due to unequal apertures. Aperture displacement may be several percent of a sub-pixel area. As a consequence, a large, tiled, flat-panel display may have an objectionable checkered appearance, due to color shifts, in spite of all efforts to geometrically hide the actual boundaries of the tile edges with external masks, located for example on the cover and back plates.

Pixels near the tile boundaries may present a different appearance, because their effective T-V curves differ from those in the interior regions. One mechanism responsible for such a difference is the variation of the LC cell gap towards the edges of the tiles. Another mechanism that often arises originates from the varying response of the liquid crystal material in the sub-pixels near the edge of the tiles. These effects may be corrected for by employing color correction algorithms and corrections to the electronic drive voltages controlling the T-V curves of appropriate sub-pixels. These color correction algorithms and techniques are disclosed in copending patent application Ser. Nos. 09/396,142, 08/649, 240, and 09/173,408, and U.S. Pat. Nos. 6,020,868 and 5,668,569.

"Artificial" boundaries similar to actual seams in tiled displays can be created in monolithic displays by the electronics used to drive the matrix addressed pixel array. Such common optical artifacts can be observed on some notebook personal computer displays because of their "dual scan" electronics, in which pixels are scanned in two distinct sets. Large monolithic displays may have to be scanned in four sets (quad scan) in order to guarantee an adequate video response. Then the pixel array is divided into four quadrants. The row and column of each quadrant are driven independently using progressive scans. Such a quad scan arrangement is likely to exhibit optical artifacts at the edges of the scan regions. Other multiple scan arrangements may similarly produce optical artifacts in monolithic displays.

Another source of artifacts arises from variations among individual driver chips that cause the drive voltages at neighboring pixels to vary by as much as 10 to 20 mV. Indeed, when the voltages, timing, or other elements of such electronic drive circuits do not match precisely, artificial electronic "seams" are generally created. In AMLCDs visible magnitude of the drive voltage differentials across scan region boundaries can be as small as 5 to 20 mV.

The flat-panel display structures used in this invention include monolithic and monolithic-like units in which pixels are addressed in a matrix fashion, but accessed from two edges, a single edge, or more than two edges of the array. While two-edge access is most common, other alternatives may be preferable for specific applications. Generally these different access configurations give rise to interconnect lines with a different length and cross-over count depending on the location of the pixel within the array. These differences alter the electrical characteristics of the pixels. For example the most significant effect is the kick-down effect that changes the LC cell voltage after charging from the It column line via the local coupling capacitance between the cell and the row line. Both the cross-over capacitance between the row and column lines and the gate-to-drain capacitance of the TFT contribute to this coupling. Depending on the design this kick-down voltage may be as large as 2V, a significant fraction of the column voltage range. It is possible to correct for the kick-down voltage by adjusting the pixel drive signals, if this effect is uniform over the array. If the kick-down voltage varies as a function of pixel location because of array accessing, for example, these corrections become much more difficult. Techniques that work for such conditions are described hereinbelow.

The current invention provides a layout of the pixel array and its access circuits to modify the electrical characteristics in order to minimize undesirable optical, electro-optical, and ambient light aberrations and any electronic anomalies creating visually perceptible discontinuities or boundaries. These artifacts are reduced to levels that allow color correction means to be applied, as shown in U.S. Pat. Ser. No. 09/396,142. The resulting display presents luminance and chromaticity outputs from areas of originally varying optical response that become uniform within human visual tolerances.

It is an object of this invention to provide compensating means for correcting for the effects induced by any other optical, electro-optical, mechanical, or structure related anomalies in large monolithic or monolithic-like LC displays. These include, for example, the variations in the cell gap, determined by the size and placement distribution of spacer balls or fiber and by stresses generated within the assembly. Chromaticity and luminance variations at the boundaries are either corrected or smoothed over a predetermined width, so that residual variations are suppressed and boundaries or seams become visually imperceptible.

It is another object of this invention to correct for optical aberrations caused by artificial boundaries (seams) due to partition in the electronic circuits, including those for generating or transmitting pixel scans, light valve controls, and pixel drive signals, whether occurring on monolithic, monolithic-like, or tiled displays.

Another object of this invention is to electronically correct the brightness of all pixels across the interior of the pixel array, whether tiled or monolithic, so that the display presents a visually uniform luminance and chromaticity to the viewer. Such corrections are made for each display assembly and are unique to that display.

SUMMARY OF THE INVENTION

In accordance with the present invention there are provided a number of techniques for assembling large, robust monolithic and monolithic-like flat panel displays. Many techniques originally developed for creating tiled, flat-panel displays having visually imperceptible seams may be advantageously applied to these monolithic structures. By doing so, the visual sharpness, contrast, and display form factor may be improved. In addition, color and luminance balance across these monolithic displays may also be improved. Segmented row and column lines facilitate the construction of large displays beyond the thin-film RC-limit.

BRIEF DESCRIPTION OF THE DRAWINGS

A complete understanding of the present invention may be obtained by reference to the accompanying drawings, when considered in conjunction with the subsequent detailed description, in which:

FIG. 3 is a plan view of three embodiments of light collimating lattice geometries: (a), (b) and (c) for square, triangular, and hexagonal geometry, respectively;

FIG. 8 presents a topographical map of typical color shifts and color graduation variations resulting from a variety of mechanisms in a large monolithic-like, AMLCD, flat-panel display assembly;

For purposes of both clarity and brevity, like elements and components will bear the same designations and numbering throughout the FIGURES.

DETAILED DESCRIPTION OF THE PREFERRED EMBODIMENT

The present invention pertains to manufacturing and assembly of large, monolithic, monolithic-like, or tiled AMLCD flat-panel displays with diagonal sizes from about 20" to 50", and more specifically to: hardware structures; assembly designs; optical enhancements; control, drive and correction electronics; and back light systems that facilitate wide view angles in consumer electronic SDTV or HDTV applications. The present invention also embodies corrective means for brightness and color discontinuities and their topographical variations that are objectionable to the viewer and that require special optical designs and the ability to correct the display with unique algorithms and control electronics.

Figure 1:
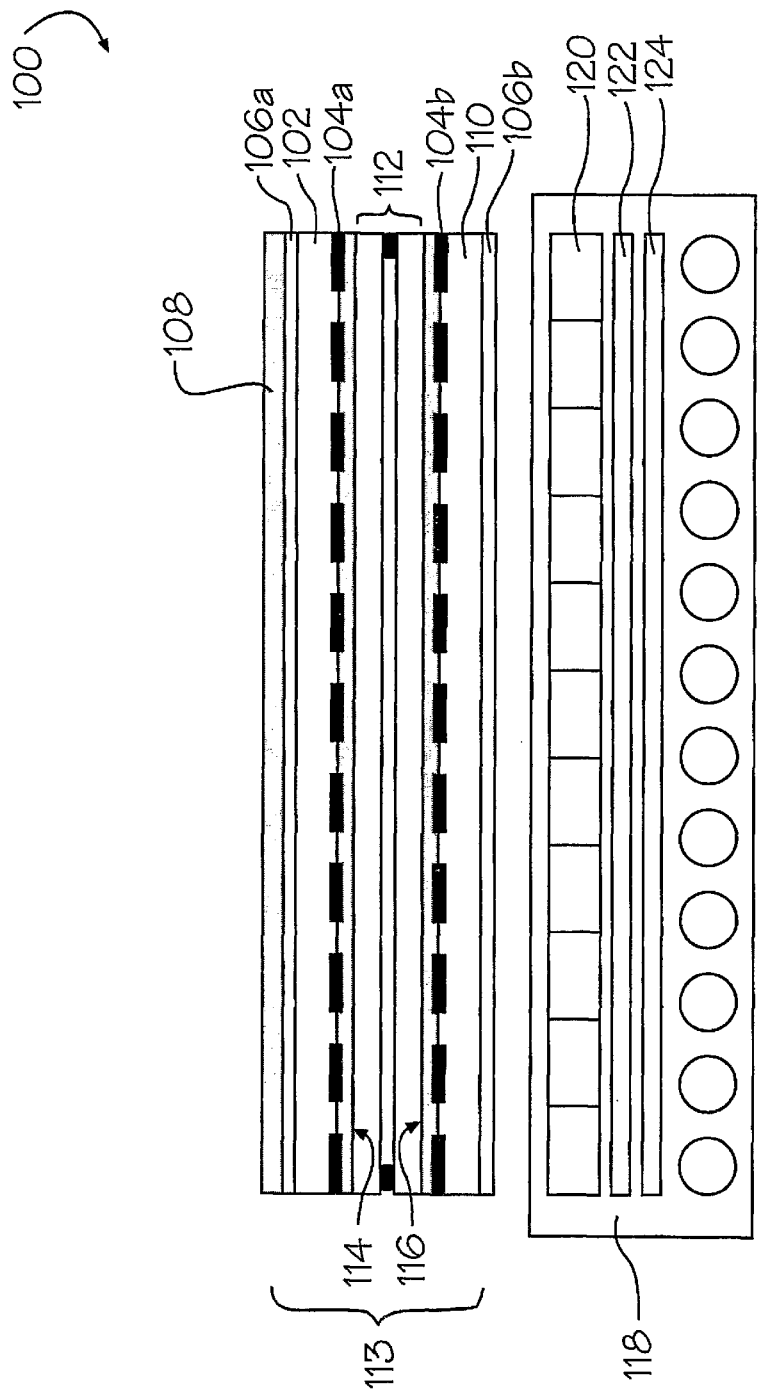
FIG. 1 displays a cross-sectional schematic view of a portion of a large, monolithic, AMLCD, flat-panel display with a robust structure, optical enhancements, and lighting means for consumer applications.

A cross section of an assembled, robust, laminated, large monolithic AMLCD display 100 is shown in FIG. 1. A cover plate 102 contains a mask 104a on one side and polarizer 106a on the opposite side. A screen 108 is adhesively bonded to the polarizer 106a. A back plate 110 contains a second mask 104b on one side and a polarizer 106b on the opposite side. A LC display module 112 is sandwiched between the cover plate 102 and the back plate 110 and is adhesively bonded over the full face with compliant polymer films, 114 and 116 respectively. This assembly forms the display laminate 113. A light box 118 contains a light collimating mechanism 120, a light enhancing film 122, and a light diffuser 124. A specific light box and light collimation mechanism are described in copending U.S. patent application Ser. Nos. 09/407,619, 09/406,977, 09/407,620, 09/024,481.

Figure 2:
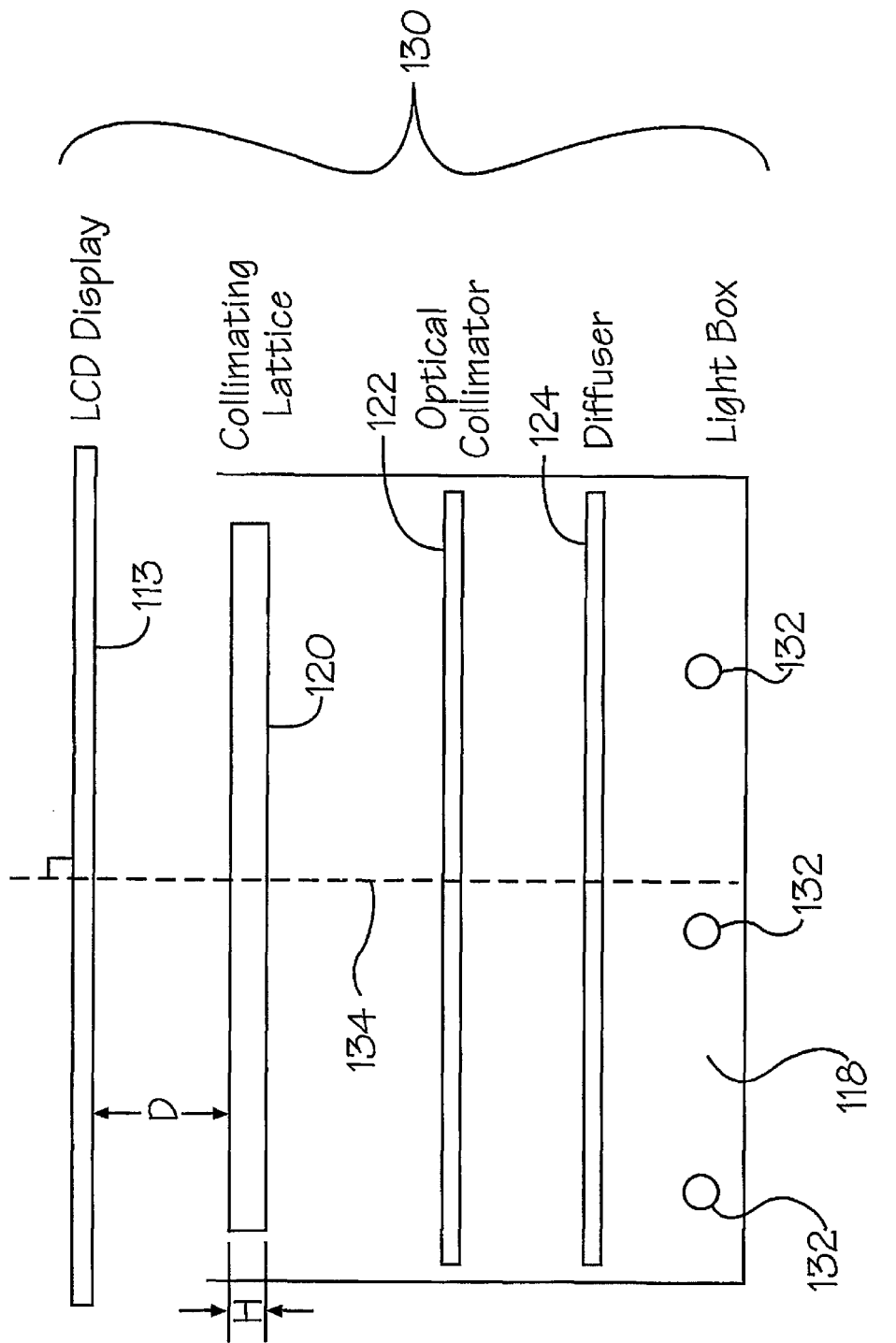
FIG. 2 shows a cross-sectional schematic view of the preferred embodiment of the light collimating illumination source with the associated monolithic, flat-panel display assembly superimposed on the top.

Referring now to FIG. 2, a cross-sectional view of a monolithic, flat-panel display assembly is shown, generally at reference numeral 130. This assembly 130 also contains the inventive collimating lattice 120. The assembly 130 utilizes a conventional light box 118 in conjunction with the collimating lattice 120 and the robust laminated LCD structure 113 depicted in FIG. 1.

A conventional light source for an LCD display 130 normally consists of four elements: a light box housing 118 with one or more fluorescent lamps 132, a diffuser sheet 124, and an optical collimator (brightness enhancing film) 122 and reflecting cavity. The fifth element added to the light source in this invention is the unique collimating lattice 120, which has a depth H and is placed at distance D from the LCD display 112. The lattice 120 is used to efficiently produce the collimated light in combination with a screen that is needed in order to generate a sharp image at wide view angles on the large, flat-panel display, 130; The significance of dimensions H and D (FIG. 2) and choices for their values are discussed in detail herein below.

Referring now to FIG. 3, plan views of three possible geometric shapes for cells of light collimating lattice assemblies are shown. These are three possible embodiments of the collimating lattice of the instant invention. The upper, middle and lower sections of FIG. 3 show a lattice of square cells 136, triangular cells 140, and hexagonal or honeycomb cells 150, respectively. The lattice cells 136, 140, and 150 can be characterized by their typical width W 132, 142, and 152, respectively, of about 3–5 mm. The lattice cells 136, 140, 150 may be constructed from any material that is thin compared with the size of a pixel. Such materials include plastic, paper, aluminum, or other metals. The interior surfaces of the cells in the lattice may be plated, dyed, painted, or treated in any other way to produce surfaces with a uniform but low specular and diffuse reflectivity for all wavelengths contained in the visible spectrum of light originating from the light source. Instead of a specific surface treatment, the material itself can be non-reflective.

The thickness of the cell walls in the cells 136, 140, 150, of lattice 120, shown in FIG. 3, should be minimized to permit as much light as possible to pass through the lattice cells 136, 140, 150. In the preferred embodiment, a commercially available aluminum honeycomb lattice is spray- or dip-painted with suitable paint.

Figure 4:
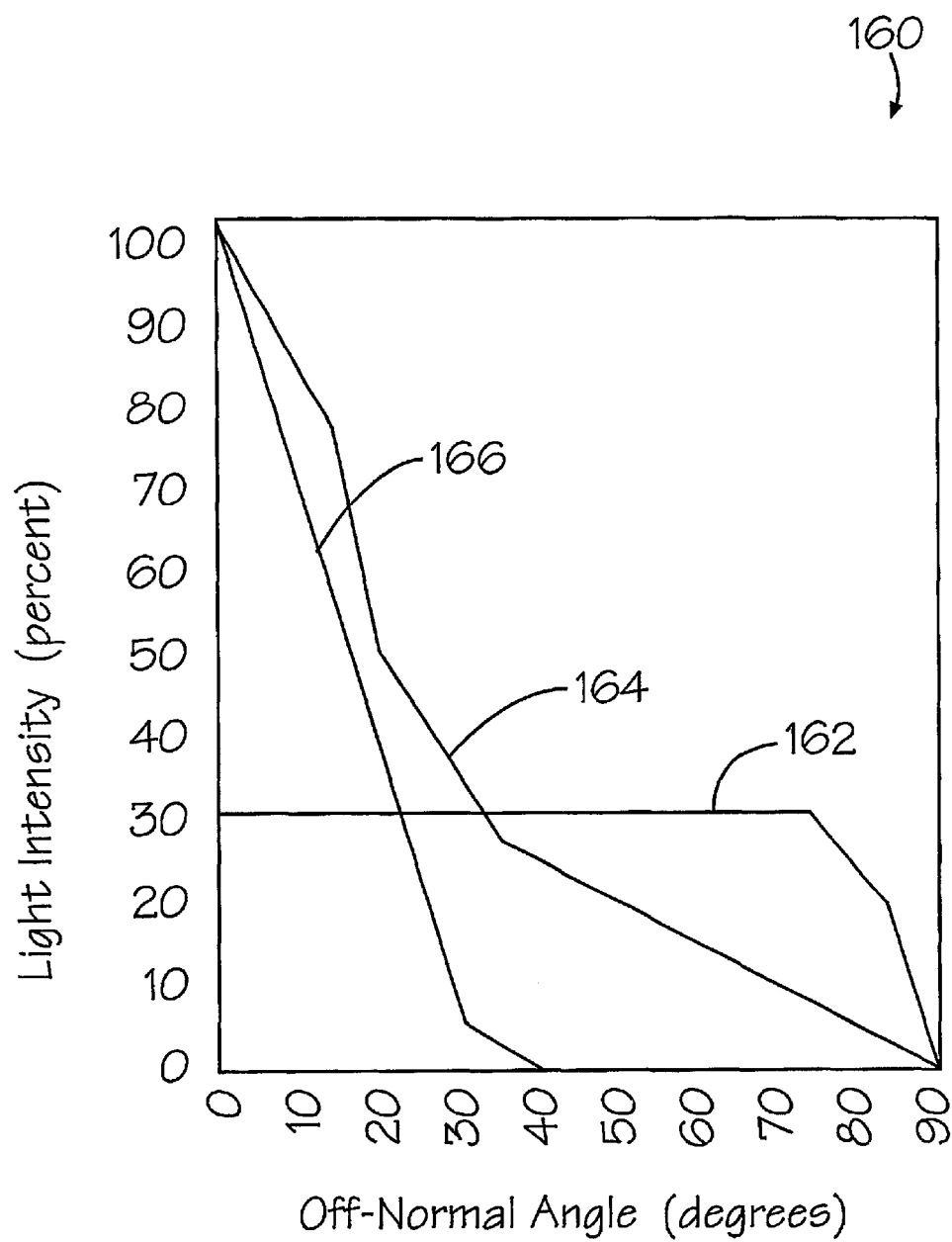
FIG. 4 is a diagram showing the light collimating characteristics, relative light intensity as a function of the off-normal angle, for various light collimating elements: lattice collimator, an optical collimator, and a diffuser being shown.

Referring now to FIG. 4, there is shown a graph 160 of the relative collimating efficiencies of various light collimating elements of the light source shown in FIG. 2: diffuser 124, optical collimator, 122, and lattice collimator 120. Referring again to FIG. 2 an ideal diffuser 124 disperses the light from lamps 132 forward in all directions, at a uniform brightness. Light intensity should be constant at all angles measured with respect to a line 134 normal to the front or rear surface planes of the diffuser 124. Light of this nature is referred to as Lambertian. The light from the lamps 132 first passes through diffuser 124 and then passes through optical collimators or brightness enhancing film 122. These readily available devices are usually constructed of prismatic array micro-geometry which change the Lambertian-like light distribution from a typical diffuser to a more forward directed distribution, producing the light intensity versus off-normal angle curves 162 and 164, respectively. This is achieved through refraction and recirculation of light.

The light energy at angles above the desired cut-off angle (i.e., that which remains when only the diffuser 124 and optical collimator 122 are used) may be too high for use with the inventive monolithic-like flat-panel display having a wide view angle and visually sharp appearance. The addition of the collimating lattice 120 in accordance with the invention removes light in a desired angular distribution as shown in curve 166 (FIG. 4). This produces the desired sharp appearance of the display with wide view angles. Contrast, brightness and the degree of collimation involve a tradeoff that affects the light-power efficiency of the display.

Figure 5:
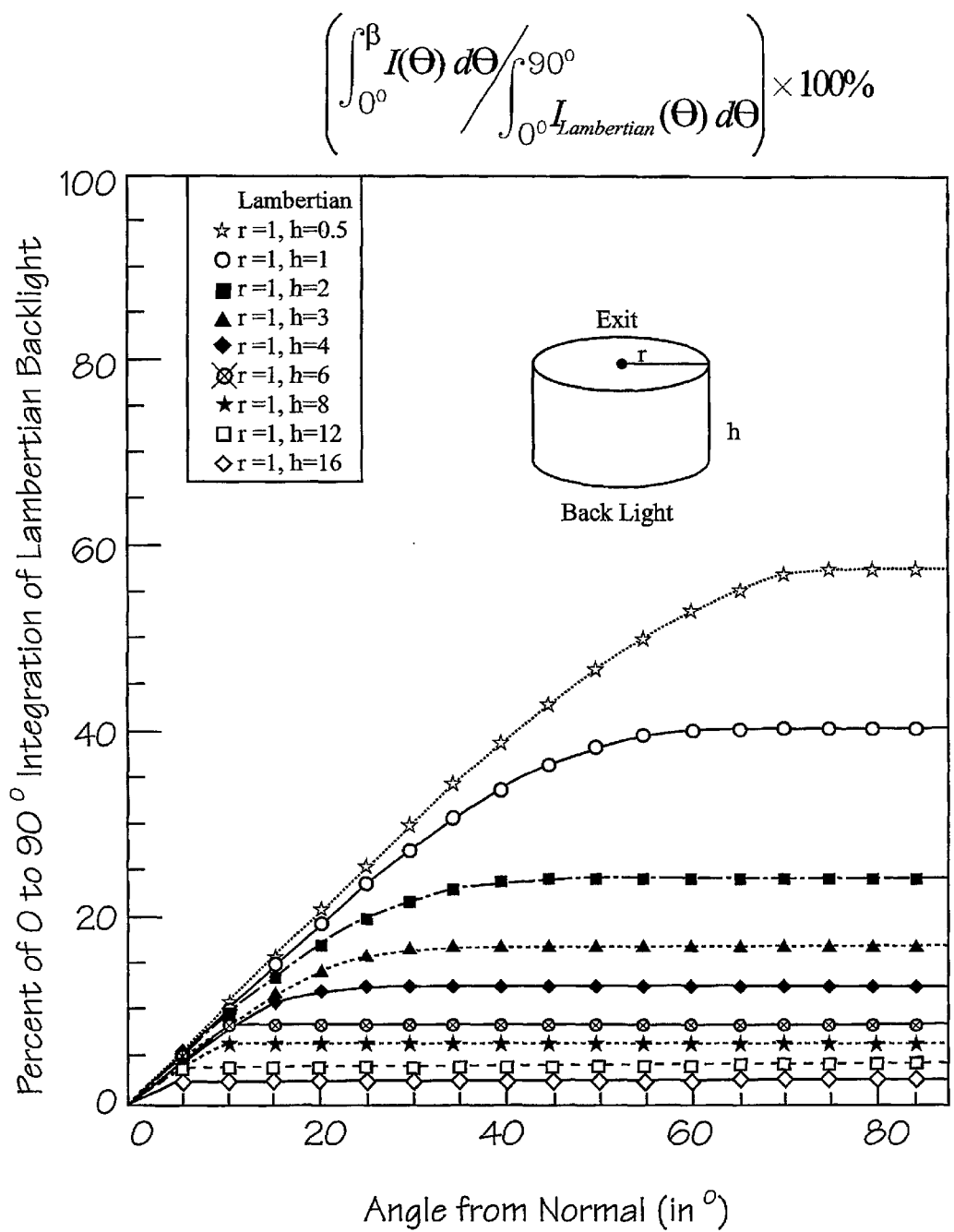
FIG. 5 shows the calculated light transmission efficiency as a function of the off-normal angle for light collimation by a cylindrical lattice with a varying angular efficiency resulting from absorbing lattice surfaces with various height to radius ratios, the insert showing the lattice cell geometry and its geometrical parameter values.
Figure 6:
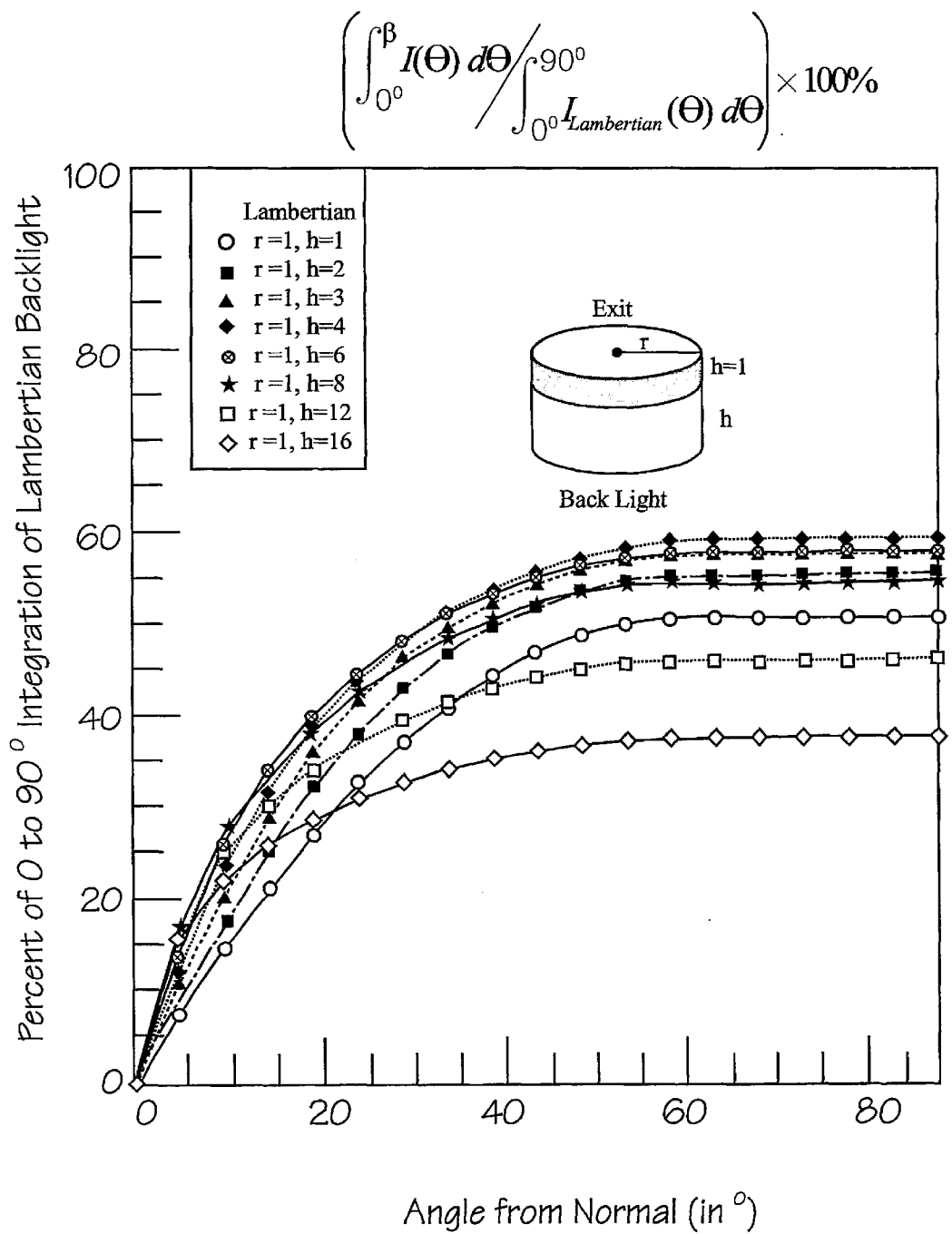
FIG. 6 shows the calculated angular light transmission efficiency as a function of the off-normal angle for a variety of lattice collimator designs of interest to large monolithic-like displays, the insert showing the lattice cell geometry and its geometrical parameter values.

A problem arises from the use of a lattice collimator 120 that is treated to produce a surface with uniformly minimal specular and diffuse reflectivity, as discussed above. As a consequence, a substantial fraction of light may be lost depending on the magnitude of the height to cell diameter ratio H/D of the lattice. This is illustrated in FIG. 5 for a cylindrical lattice collimator. An improved lattice collimator with substantially increased light can be achieved by treating the internal cell surfaces in the lower section (closer to the light source) with a highly specular reflective material (not shown), while keeping the low specular and diffuse reflectivities in the upper section. The angular intensity factors are shown in FIG. 6 for a variety of light collimator lattice designs varying the reflective sections of the lattice cell walls, while keeping the height of the non-reflective section constant.

For use with the inventive monolithic-like AMLCD FPD with wide view angles, a preferred light collimation design may be chosen that balances light intensity with good visual image acuity or sharpness at desired view angles. The inventive designs project more light forward by virtue of the reflective portion of the lattice cells, but can also achieve the desired, sharply cut-off angular distribution for application in tiled FPDs, in which wide angle light rays should be kept away from seams. A highly efficient light recirculation mechanism within the light box is preferable for this collimation technique.

Figure 7:
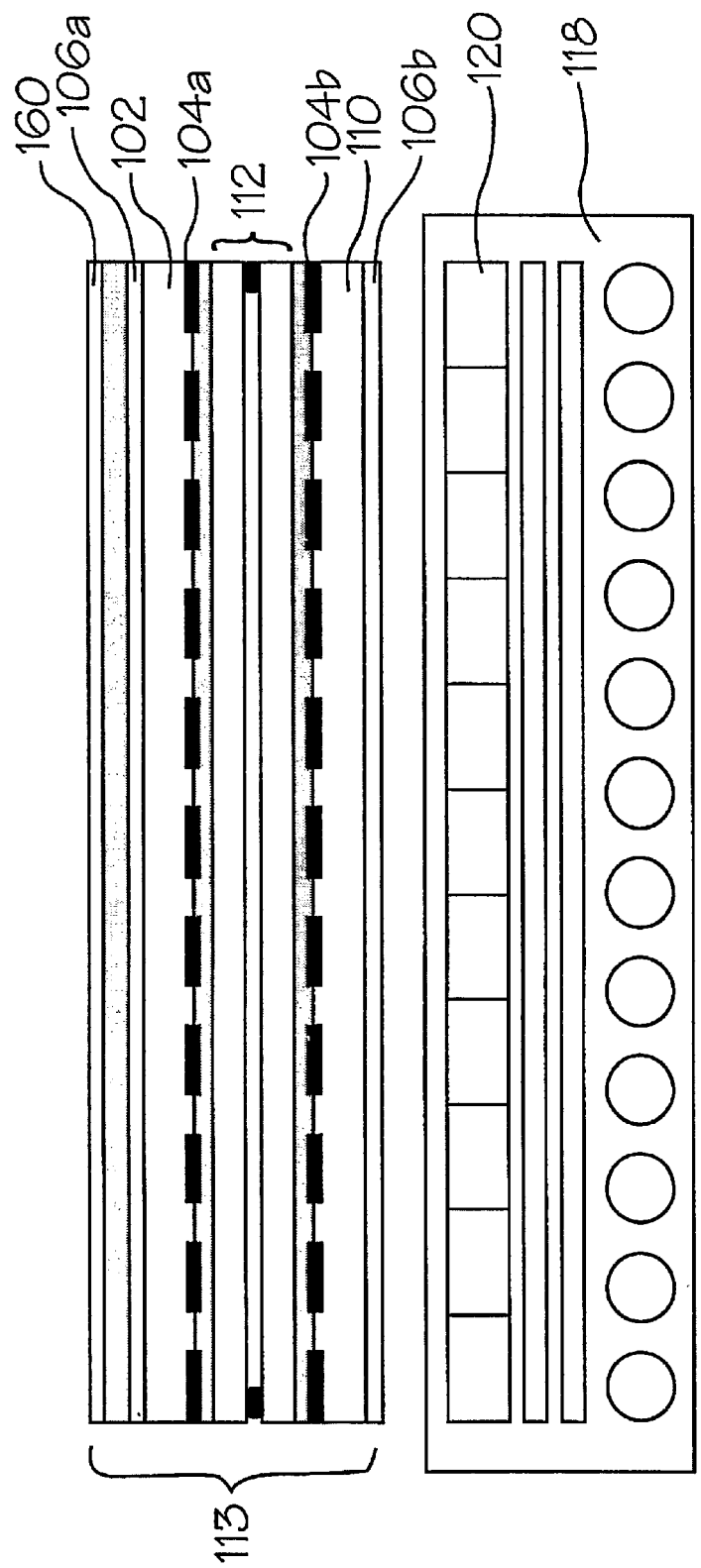
FIG. 7 illustrates a cross-sectional schematic view of an alternative embodiment of a large monolithic-like AMLCD in contrast to the design shown in FIG. 1.

An alternative effective optical stack is shown in FIG. 7. It includes the display laminate 113 and the backlight 118. In this case, an optional third polarizer 160 is inserted on the viewer's side of the screen 108 in order to adjust and counteract the ambient light passed into the optical stack from the outside and being reflected back from various interfaces within the optical stack. This undesirable reflective light would otherwise reach the viewer, superimposed on the displayed image, and therefore degrade the image modulation and contrast.

The mask 104b on the back plate 110 is not employed in the design shown in FIG. 7, because light collimation has been optimized, tailoring the lattice light collimation mechanism 120 placed within the light box 118. However, the mask 104a on the cover plate 102 is used in order to provide a desirable visual image acuity and an improvement in contrast in the view plane. An additional embodiment can be identical to this design except that it has no masks on either plate 102, 110. If masks 104a are used on the cover plate, a slight misregistration of the pixels with respect to the mask 104a causes color shifts in a tiled display due to the slight variations in the position of sub-pixel and mask apertures. Such color shifts are smaller in the image view plane of monolithic AMLCDs, but any small angular variations in lighting in the assembly cross section may still produce visually disturbing artifacts.

FIGS. 1 and 7 also feature a light box 118 that provides the assembled FPD laminate structure 113 with a desired uniform distribution of light and light collimating angles, both of which can be optimized for the chosen pixel size and optical stack height. In a monolithic design, in contrast to a tiled one, the dark space between pixels is generally much smaller. Therefore, if a mask is used, the mask stripe dimensions can be chosen to be very small. Consequently, the mask has only a minimum effect on the light-power efficiency. Furthermore, light-collimating angles in the back light can be designed to optimize the visual acuity, brightness, and contrast for wide view angles using a screen that is chosen for a monolithic display.

There are mechanisms other than physical or electronic seams that may degrade the image, as illustrated in FIG. 8. One of them is local stress that can change the cell gap. Stress variations are likely to occur near the perimeter of the display, where a panel 172 is attached to the frame. Another potential location is near an imposed stress or deformation induced by a fastener, such as a screw 170. If the cell gap in an AMLCD is decreased in any area, that area displays a blue gray color tint. Alternatively, if the cell gap is increased over a surrounding area, that area becomes brownish in color. For this reason, the polymer films encasing and sandwiching the monolithic AMLCD panel 112 should have a very small elastic modulus, preferably in the range of 1,000 psi or less and should be thick and fluidic enough during the encasing process so that the cell gap within the display panel can uniformly relax to a low stress level. Silicone is an example of such a polymer film. This encasing process and design of the cross section allows the manufactured AMLCD panels to carry a small bend or warp or have a slightly out-of-flat surface.

Flatness and the stress issues at the seal generally increase with the size of the display panel. Therefore, increasing the robustness of the cross section of the laminate 113 with cover and back plates is essential for large monolithic AMLCD FPDs in order to stabilize their mechanical cross section and especially the cell gap. The residual effect of stresses in the constrained areas of the AMLCD laminate 113 can be corrected by the methods disclosed in the aforementioned patent applications if they cause small residual brightness or hue shifts. The non-uniform cell gap locally alters the color space formed by the set of all possible tristimulus values. A spatially uniform gray scale response for all primaries and all of their luminance levels is the preferred goal.

Furthermore, if all dark space areas in the pixel array are designed to match the thickest color filter layer, the same material and thickness should be used in the perimeter outside of the pixel array in order to precisely control the cell gap in an AMLCD. This combination of a single thickest color filter layer, together with the diameter distribution of spacer balls or fibers, determines the cell gap and its uniformity. This design determines that the thin-film-transistor (TFT) and the color filter (CF) substrates are substantially parallel to each other, thus determining a substantially uniform cell gap over the entire pixel array of the display. In contrast, a design which does not incorporate a single color filter cell gap control inside and outside of the pixel array allows the lamination process to compress the plates non-uniformly, requiring substantially more color correction.

Also illustrated in FIG. 8 is a stress effect induced by combination of the polarizer, cover plate glass, or any films in the optical path that have varying birefringence over the pixel array. This may cause visible optical birefringence effects 174, when a normally-white AMLCD is operated in the dark state. Large streaky white areas superimposed on the desired image and spread over broad regions of the FPD is the resulting visual effect. These large area effects are caused by the non-uniform stresses-in the glass that are thought to arise from the directionality of the cooling when the glass sheet is manufactured. These stress effects are optically enhanced when the polarizer is attached. The brightness variations of these regions can be corrected and smoothed using appropriate software and electronics.

Still another phenomenon demonstrated in FIG. 8 is the effect of spacer balls clustering 176 on light transmission. This type of defect increases with the panel size and with decreasing panel glass thickness. The layout of the cell is also affected. The flexibility of the large glass sheets and ability of the liquid crystal material to flow across a large monolithic panel allows the spacers to relocate and collect into clusters during manufacturing as well as in field use. The thick cover and back plates decrease the flexibility by a factor of approximately eight with the lamination of thicker cover and back plates in the assembly (e.g., 1.1 mm thickness. As described above, this invention covers a cell design with a single thickest color filter in all dark space areas to make the TFT and CF glass plates parallel. The spacer balls are then free to move only within the aperture of a sub-pixel, which greatly minimizes spacer ball or fiber clustering despite the larger pixel pitch. The spacer balls in the color filter area are pinned down by the stiff laminate assembly 113 and are thus unable to migrate into clusters. Still another artifact 176' is shown. This type of artifact 176' is caused by particles trapped in the polymer adhesive films creating a cell gap local defect.

Finally shown in FIG. 8 are seam-like boundaries 178 that arise from electronic effects induced by small variations on brightness and hue over the pixel array. A variety of mechanisms can cause such electronic discontinuities over large monolithic AMLCD panels. The most probable of these are brightness and hue shifts at the boundary 178 between two pixel array regions driven by different row or column driver chips. Therefore, either one or more column driver boundaries (usually vertical) or row driver boundaries (usually horizontal) within the pixel array may appear. Brightness and hue differences, especially if they appear in a recognizable static pattern, can be induced by data voltage differences as small as 10–20 mV for LC pixels having typical T-V curves. Larger pixel drive voltage differences arising from dynamic charge effects on row and column lines are tolerable, if the displayed images change rapidly.

In most FPDs, pixels in two-dimensional arrays are addressed using matrix addressing. This requires the placement of parallel column interconnect lines into parallel wiring channels usually located between adjacent columns of pixels or on top of the pixels but away from their active areas. As an alternative, column lines can also be grouped together and entire groups placed into these wiring channels. Each pixel or sub-pixel typically is then connected to one of these column lines, usually the closest line.

Figure 9A:
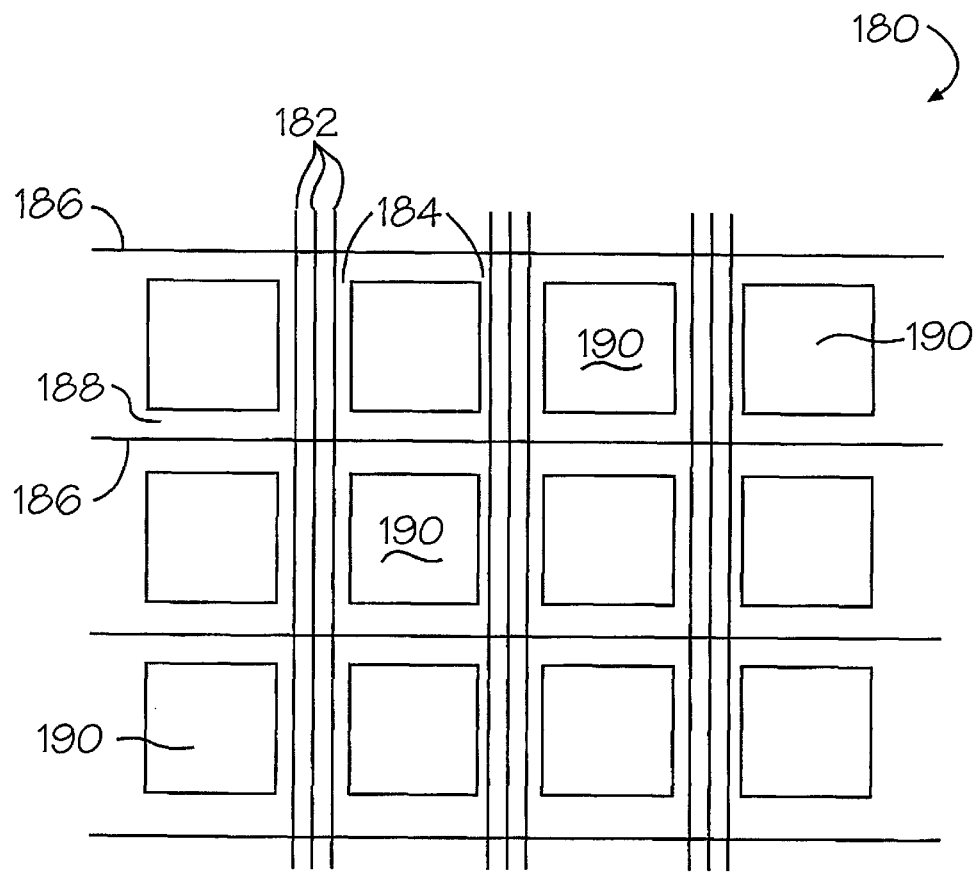
FIG. 9a is schematic representation of a two-dimensional pixel array showing row and column lines.

Referring now to FIG. 9a, there is shown a matrix addressed, two-dimensional pixel array 180. Pixels 190 are bounded by vertical column channels 184 into which groups of three column drive lines 182 are placed in this illustration. Pixels 190 are also bounded in the horizontal direction by horizontal wiring channels 188 into which single row lines are placed. Pixels 190 represent typical groups of three sub-pixels (not shown), each sub-pixel being connected to one of the group of three column lines 182 and the common row line 186. It will be obvious to those skilled in the art that other sub-pixel arrangements in combination with other wiring strategies could also be used to meet other operating requirements or environment needs. Similarly, parallel row lines are placed into wiring channels located between rows of adjacent pixels either one at a time or as groups. Each pixel or sub-pixel is then connected to at least one such row line. In combination, these orthogonal sets of row and column lines 186, 182 respectively, facilitate matrix addressing of pixels 190.

Figure 9B:
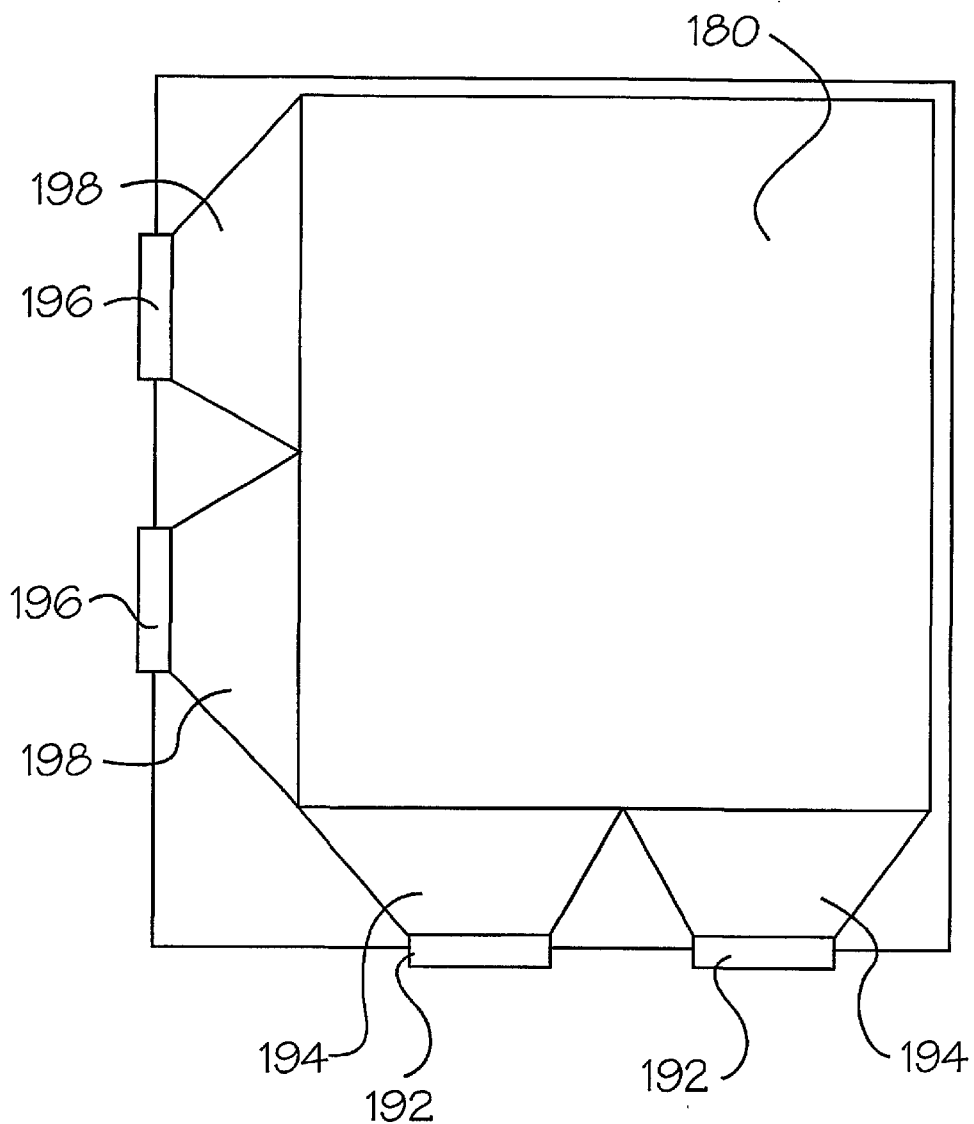
FIG. 9b is schematic representation of a two-dimensional pixel array showing columns running vertically and terminating in tape-automated-bonded connections (TABs) on the lower edge and row lines running horizontally and terminating in TABs on an adjacent edge.

In this configuration, row and column lines 186, 182 may be routed from two adjacent edges (not shown) of the display, or from all four edges, across a fan-out region to the appropriate TAB connection and driver circuit. Since the ordering of column and row lines 182, 186 at the edge of the pixel array 180 can be the same as that of the driver circuits (not shown), this routing allows simple, non-overlapping fan-out patterns as shown in FIG. 9b. This is a conventional, two-sided arrangement. Externally generated signals are applied to the column drive lines of the display at one or more column TABs 192. A column fan-out region 194 interconnects column drive lines 182 (FIG. 9a) with column TABs 192. Likewise, externally generated row signals are applied to the display at one or more row TABs 196. A row fan-out region 198 interconnects row drive lines 186 (FIG. 9a) to row TABs 196.

If it is desirable to access pixels via matrix addressing inside the array but route to the column and row lines to edges of the substrate other than two adjacent edges, or even to all four adjacent edges, then the access wiring pattern must be changed significantly. Two access wiring configurations have been found to be particularly useful: wiring from only a single edge and wiring from two opposite edges. Wiring from at least one edge has been described in U.S. Pat. Nos. 5,889,568 and 5,867,236.

Figure 9C:
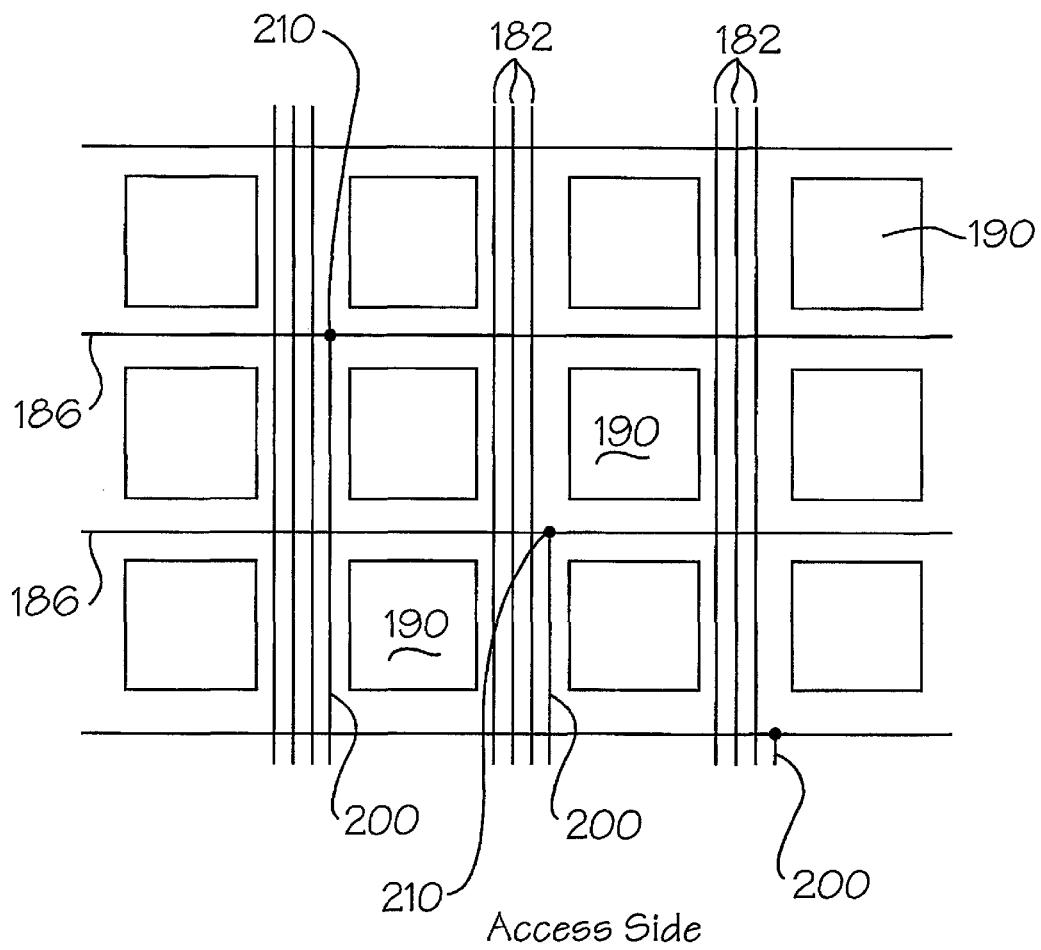
FIG. 9c is a schematic representation of a two-dimensional pixel array showing row and column lines both terminating at the single, bottom panel edge.

Referring now to FIG. 9c and U.S. Pat. No. 5,867,236, there is shown one possible wiring routing which allows single sided wiring access to the display. This arrangement of row, column, and access interconnections allows wiring from only the bottom edge of a matrix addressed display. Since in this case access wiring is done from an edge perpendicular to the column lines 182, it is advantageous to run column lines 182 to the lower edge as in the conventional configuration (FIG. 9a) and also to route row lines to this same edge using row access lines 200 running from the edge to the appropriate row line 186 within the pixel array. An electrical connection between the row lines 186 and row access lines 200 is made at appropriate places marked by symbols "•" in FIG. 9c. In this case, three column lines 182 are connected to each pixel 190 which comprises three sub-pixels (e.g., red, blue, and green), each of which requires its own column line 182.

Figure 9D:
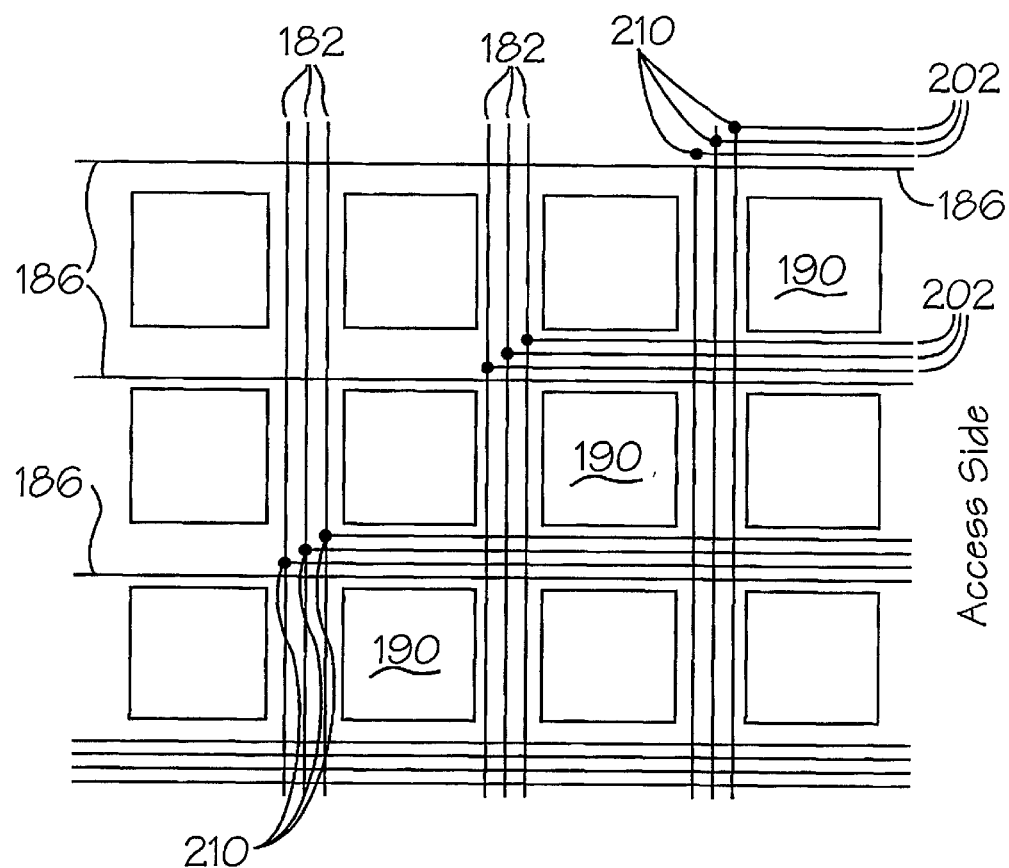
FIG. 9d is a schematic representation of a two-dimensional pixel array showing row and column lines both terminating at a single panel edge perpendicular to the edge shown in FIG. 9c. This particular configuration has been shown in U.S. Pat. No. 5,867,236.

Referring now to FIG. 9d, there is shown similar wiring for access from an edge perpendicular to column lines 182. This arrangement is topologically similar to that shown in FIG. 9c, except that there will be more column access lines 202 than row access lines 200 in displays with multiple sub-pixels.

Figure 9E:
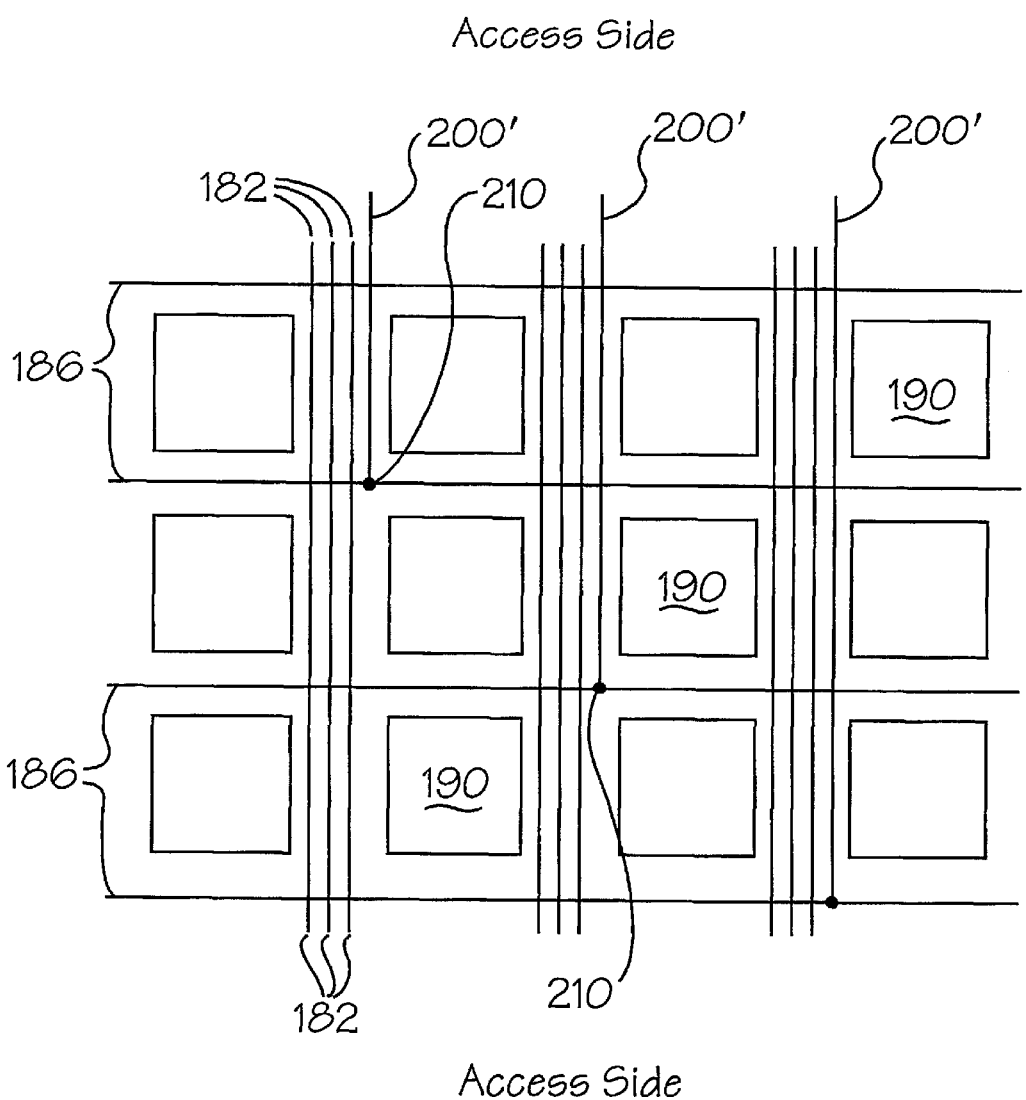
FIG. 9e is schematic representation of a two-dimensional pixel array showing row and column lines terminating at both the top and bottom panel edges.
Figure 9F:
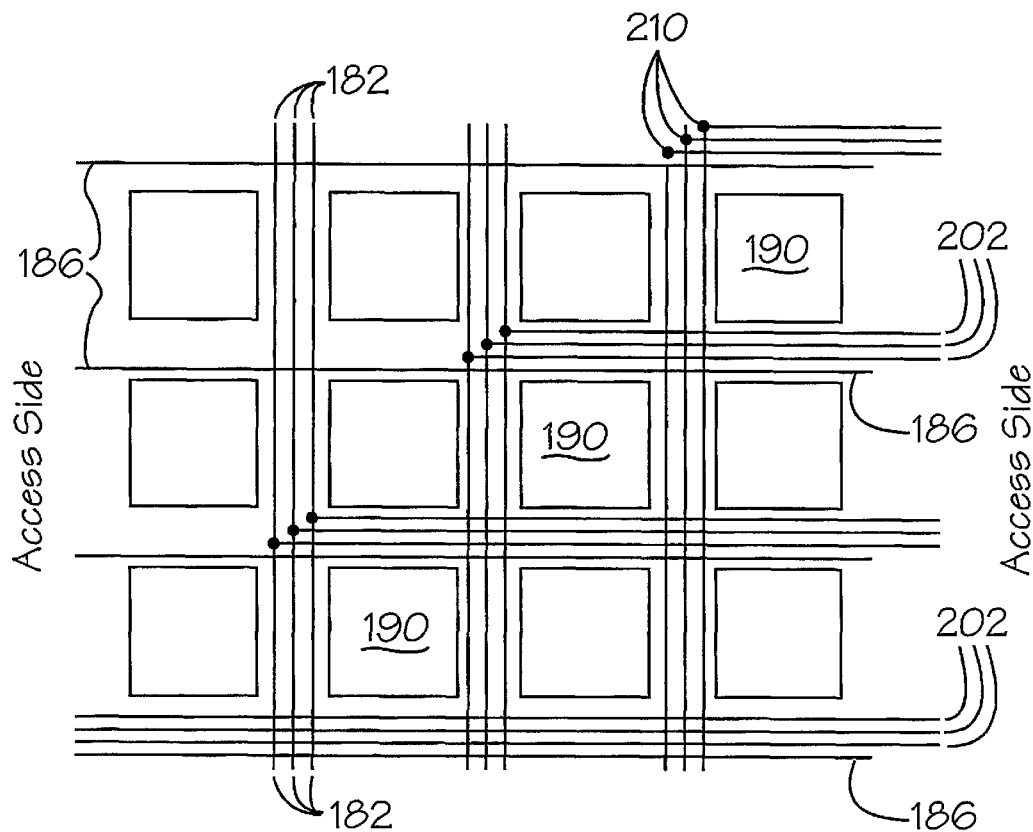
FIG. 9f is a schematic representation of a two-dimensional pixel array showing row and column lines terminating at both the right and left panel edges.

The wiring configurations for two-sided access, in which row and column lines are accessed from two opposite sides, leads to the wiring configurations shown in FIG. 9e which shows access edges perpendicular to column lines 182. Similarly, two-sided opposite edge wiring for the edges perpendicular to row lines are shown in FIG. 9f.

Note that when single-sided wiring is used (FIGS. 9c, 9d), row and column lines 182, 186 respectively and/or related access lines 200, 202 may be intermingled. These lines are normally ordered when two-sided access wiring is used. Therefore, when single-sided wiring is used, special interconnect strategies are preferred for reordering the access and column or row lines. These reordering strategies are not generally necessary when traditional two-sided wiring topologies are used. This reordering can be done either in the wiring medium on the display TFT substrate or, alternatively, in the outside wiring medium (e.g., a printed wiring board or a flex substrate). If multi-layer TABs are employed reordering could be done on the TABs as well.

Figure 9G:
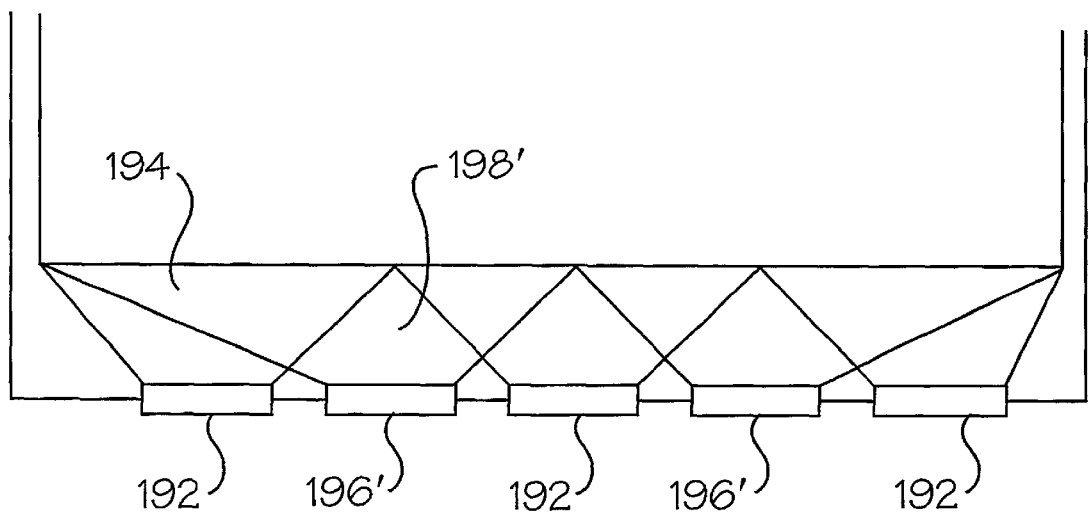
FIG. 9g shows an example of a fan-out region for use with a single-sided wiring arrangement such as shown in FIG. 9c.
Figure 9H:
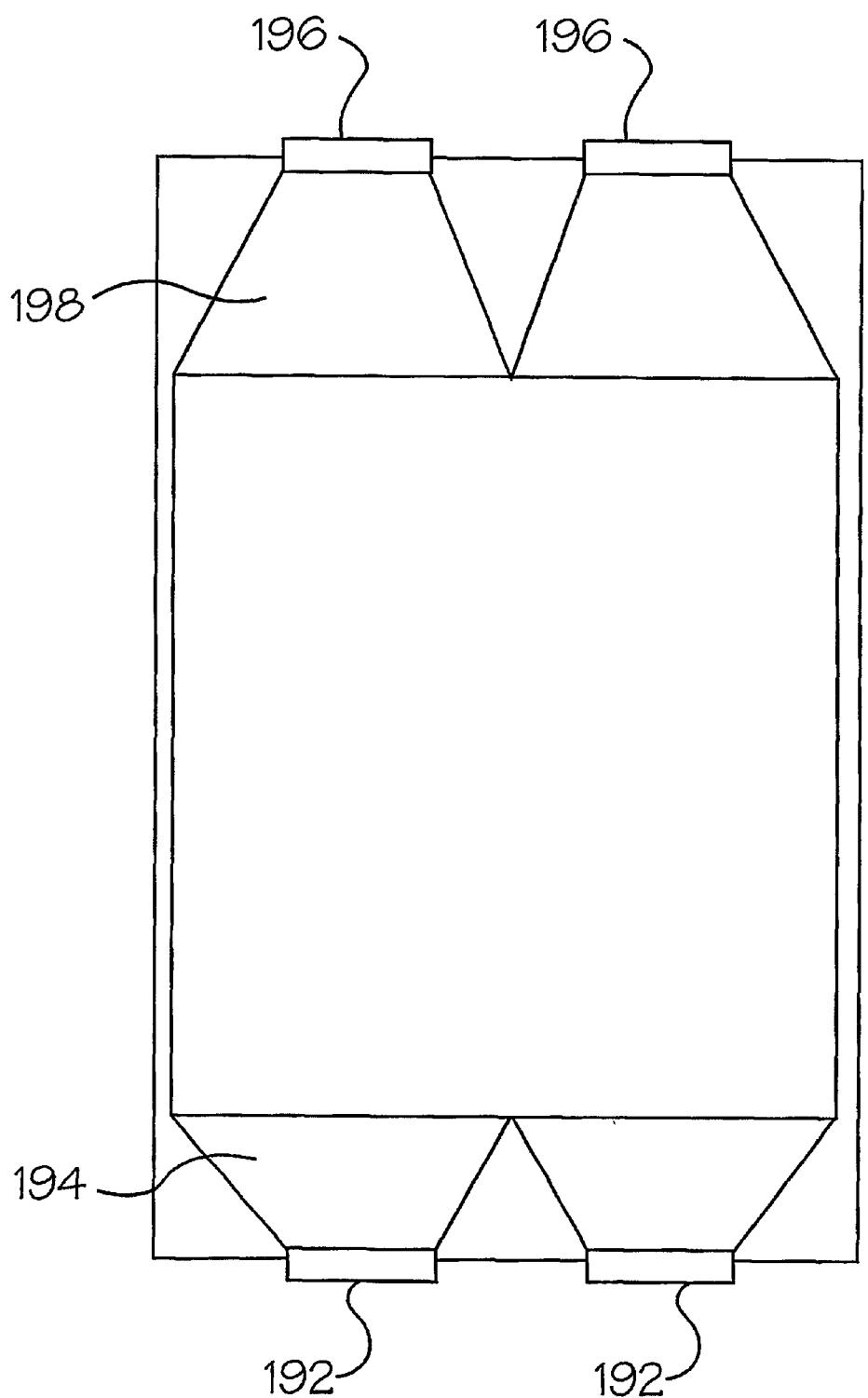
FIG. 9h shows an example of a fan-out region for use with a wiring arrangement terminating on two parallel edges such as shown in FIG. 9e.

The implementations of the access wiring on the display substrate for the single-sided and two-sided examples shown in FIGS. 9c and 9e are shown in FIGS. 9g and 9h, respectively. In order to reorder any intermingle row and column lines 182, 186 they must be able to cross over each other, separated by a suitable dielectric (not shown). The column lines 182 may be routed directly to column driver circuits (not shown) located behind the column TAB edge and row lines are routed to the same edge to row TABs using row access lines running parallel with the column lines and row fan-out lines that cross column fan-out lines. Similarly, row lines 186 may be routed directly to row driver circuits located behind the row TAB connections, while column lines may have to cross over row lines to reach column line TABs at the same edge.

FIG. 9g shows a reordering fan-out routing for column and row lines 182, 186 divided into three and two subsets 194, 198', respectively. Any number of sub-sets, of course, could be used. The number of subsets is determined by the number of driver circuits serving each TAB connection 192, 196'. With the reordering of row and column lines additional row-to-column line cross-over points will be generated in the fan-out region. No reordering is generally necessary for two-sided opposite edge access as is evident from FIG. 9h.

The above reordering of row and column lines relative to the electrical connections at the edge of the TFT glass substrate, for example TAB connections, allows additional optimization of the fan-out lines. Depending on the number of parallel driver circuits on the row and/or column driver chips, the reordering leads to different fan-out patterns as illustrated in FIGS. 9j and 9k. Two specific topologies are shown. In FIG. 9j there are only two driver chips, one for row drivers and the other for column drivers. This creates a wide fan-out pattern and many cross-over points between row and column fan-out lines. As a consequence, fan-out lines are rather long and the amount of capacitive coupling may be quite large. The number of driver chips, however, is minimized. At the same time, the risk for inter-layer shorts is high. In FIG. 9k, two row driver chips and three column driver chips are shown. In this topology fan-out patterns are narrower, fan-out lines are, on the average, shorter, the number of cross-overs between row and column fan-out lines is smaller, and the capacitive coupling between row-to-column lines lower compared to those of the topology shown in FIG. 9j. Therefore, the reordering topology, combined with the selection of the width of row and column driver chips, allows for the optimization of line lengths, cross-over capacitances between row and column lines in the fan-out, and risk for electrical inter-layer layer shorts between row and column fan-out lines.

Note that column and row line reordering is not needed if column and row driver circuits can be mixed on the same integrated circuit chips (i.e., driver circuits). However, this is usually not the case because drive voltage levels and transition times are generally different for rows and columns. For example, in an AMLCD, row lines are usually connected to TFT gates, whereas column lines are routed to TFT drain or source electrodes. Row voltage transitions as large as 40 V are often used compared column voltage transitions on the order of 10 V.

Figure 9I:
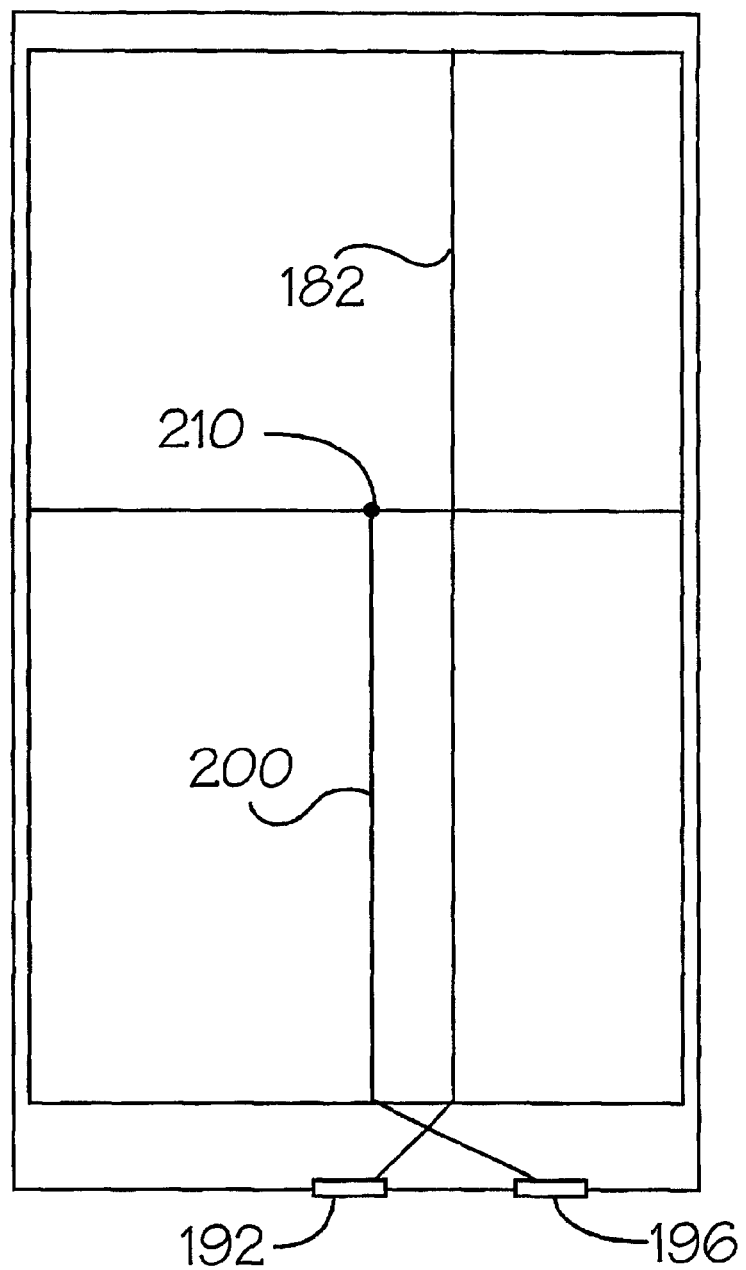
FIG. 9i shows the routing of row and column interconnect from the row and column TABs for single edge wiring access.
Figure 9J:
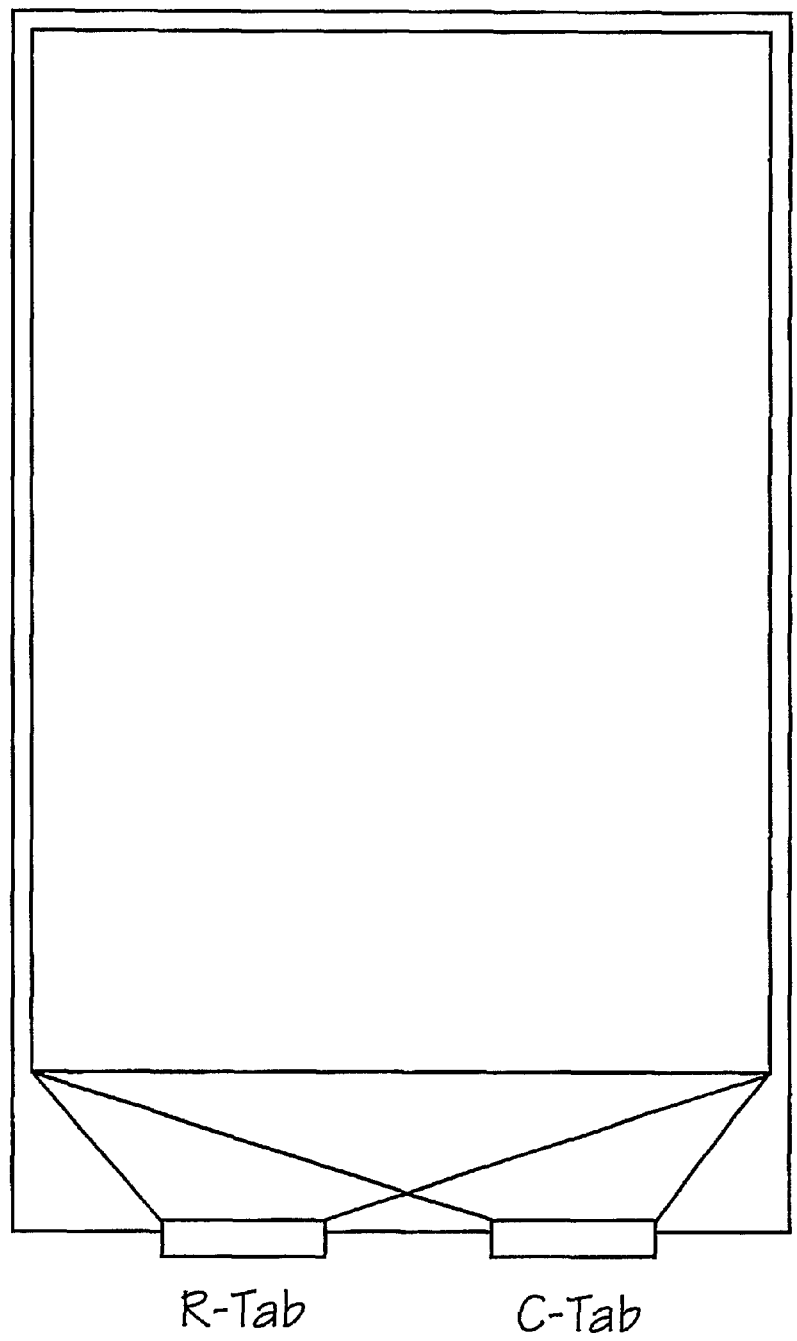
FIG. 9j shows a fan-out topology for single row and column driver circuit chip.
Figure 9K:
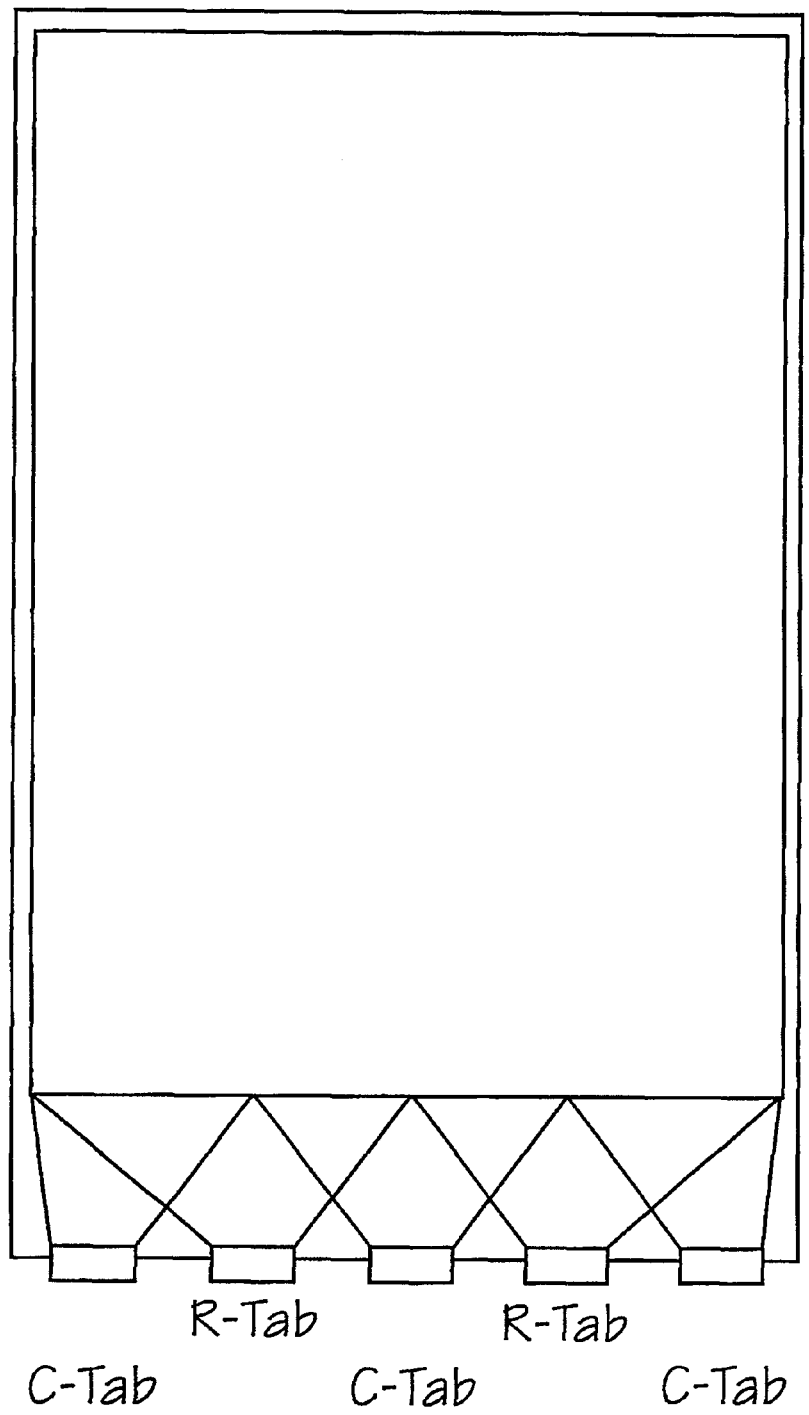
FIG. 9k shows a fan-out topology for two row driver and three column drivers circuit chips.

The required signal path for single-sided addressing of a matrix addressed pixel array is illustrated in FIG. 9i for a single pair of row and column lines. The row signals run from the row driver circuits to row TABs 196, from there along the row fan-out line 201 to the edge of the pixel array crossing at least one or no column fan-out lines 182, subsequently running along the row access line 200 into the contact between the row lines, and finally arriving through the row line to the pixel. A similar path is provided from the column driver circuits to the pixels in the array.

Display designs that access the matrix addressed pixel from opposite edges of the array (FIG. 9h), or with access from a single edge (FIG. 9g), show electronic artifacts in particularly disturbing ways. Since the interconnect layout and distances from the driver chips to individual pixels vary much more than in conventional matrix addressed displays with array access from two adjacent edges, pixel drive signal delays and waveforms may vary significantly from pixel to pixel in a spatially discontinuous way, thus possibly producing visible patterns. Row pulse variations have less effect on pixels because row lines generally select pixels rather than provide the data that sets the light valve to one of its discrete levels, usually to a precision of 8 bits or 256 levels. Column pulse levels must be controlled to the precision of the least significant bit in the given timing window. For example, for 8 bit operation with a maximum data value of 5V, the least significant bit is about 20 mV for uniformly spaced levels.

Figure 10:
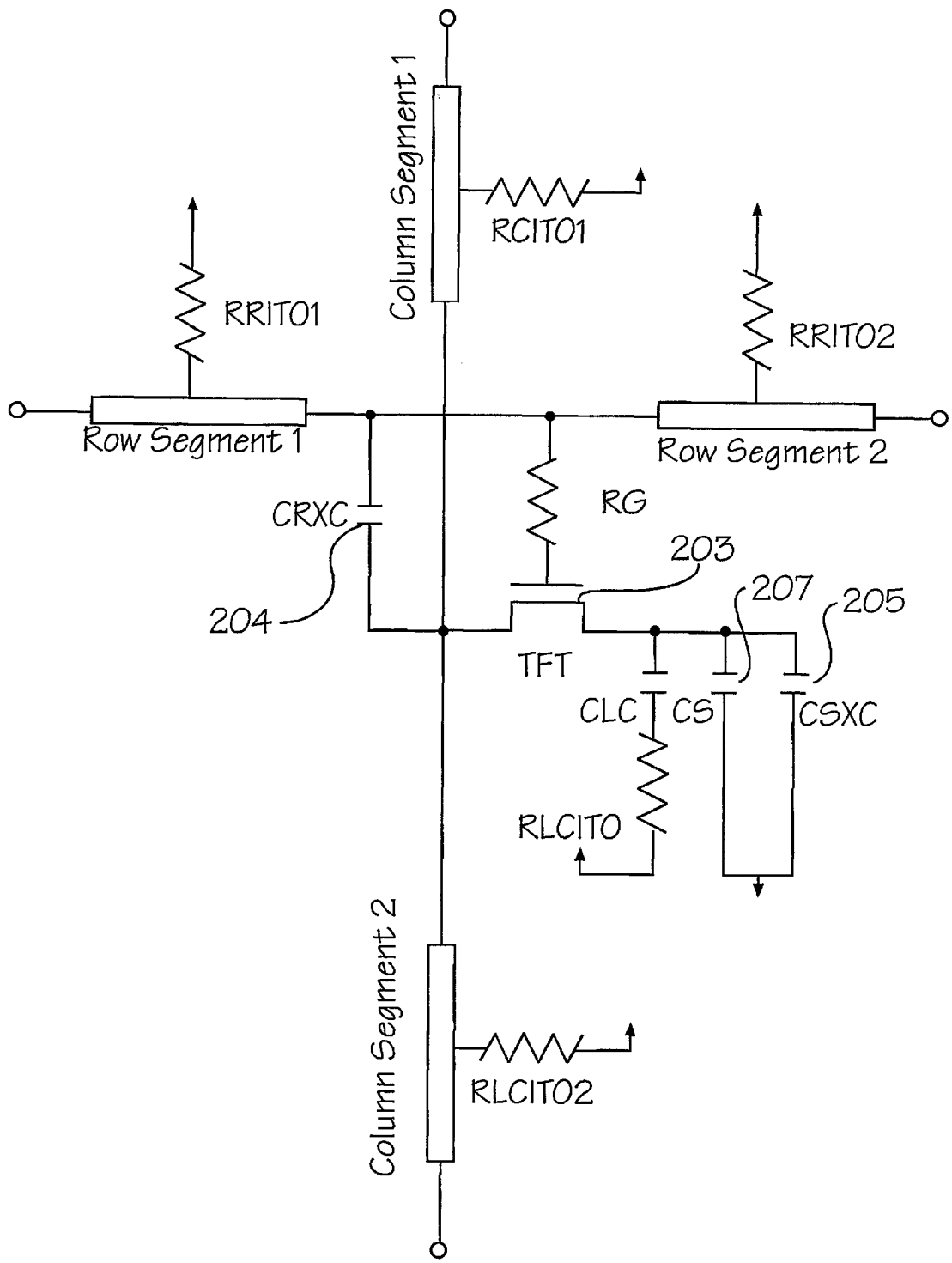
FIG. 10 shows an equivalent circuit model for a liquid crystal cell within a sub-pixel for a typical AMLCD.

However, because of the capacitive coupling between row and column lines at row and column overlaps and through any active devices, such as TFTs used to select and write control voltages into the LC color valves, pixel data voltage waveforms are affected by local capacitances within each pixel and distributed global capacitances in the column and row line circuits. FIG. 10 is a schematic circuit diagram showing two coupling capacitances: $C_{RXC}$ 204 between the column and row lines at a single intersection within the display matrix, $C_{SXC}$ 205 between the LC pixel and any adjacent crossed column lines. In FIG. 10 $C_{SXC}$ has been for simplicity been drawn in parallel connected to the common return line for the storage capacitor $C_S$ 207.

In FIG. 10 the coupling capacitances 204 and 205 generally contain voltage-dependent capacitive contributions from the TFT, specifically from the gate-to-source and/or gate-to-drain capacitances. These capacitances depend on the layout of the TFT, which is determined by the current drive capability of the TFT, when changing the LC cell and the storage capacitor to the holding voltage, and by the off-state leakage current during the cell voltage hold time. The TFT layout design is also influenced by the characteristics of the column driver circuit in terms of its voltage levels (single or variable during the charging of the LC cell). The third main factor determining the TFT layout arises from the driving scheme for the display frames. All such driving schemes should guarantee zero DC current across the LC cells over many frames, which is usually accomplished by inverting the polarity of the driving voltage of each cell over adjacent frames or lines. This leads to driving schemes such as frame inversion and line inversion. Because of the need to invert the polarity of each pixel periodically, the drive current from the TFT can be minimized, if each pixel can be pre-charged to the right polarity during the previous charging time. Driving schemes, such as double-on with two next nearest neighbor lines being changed up at the same time, can therefore be used to minimize the TFT drive current. Consequently the required channel width of the TFT, or if multiple TFT's are used the combined width of all TFT channels, can be minimized. This minimizes the TFT gate-to-source and gate-to-drain overlap capacitances and at the same time the variation of the voltage wave forms across the pixel array. The minimization of the TFT width is especially important considering the fact that the TFT capacitances depend on the time-dependent gate-to-source and gate-to-drain capacitances.

One of the most significant capacitive coupling effects produces the so-called data voltage "kick-back" or "kick-down" effect. It reduces the voltage stored into the cell that is maintained for the entire frame time until the next data voltage is written. The magnitude of the kick-down voltage is determined by the design of the display. It may be as large as 2V in a typical AMLCD. A specific example of the kick-down effect for an AMLCD design with a 60 Hz frame rate and 1 mm pixel pitch is given in FIG. 11. The parameters for this simulation are selected to correspond to the display design detailed in our copending U.S. patent application Ser. No. 09/490,776 filed Jan. 24, 2000.

If these capacitive coupling effects on LC cell voltages are substantially uniform over the entire pixel array, they can be compensated easily by adjusting data voltages, common voltages, or reference voltages that are used by the digital-to-analog (D/A) converters to produce the actual row column voltage waveforms. Alternatively, if these effects vary slowly with location (low spatial frequency), they usually lie below the brightness and color contrast sensitivity functions of the viewer, and thus do not appear visually objectionable. However, generally in large FPDs, and especially in large FPDs with unconventional array access (e.g., opposite or single side access), the global distributed capacitance may vary significantly even if local intra-cell capacitances are uniform. Therefore, the resulting pixel drive voltage levels and waveforms produce varying luminance and chromaticity over the pixel array. If such variations occur smoothly over many pixel pitches, they are not as readily visible as in cases where adjacent pixels are affected or patterns emerge. Because of the regular layout of row and column lines, and because any access lines from driver chips to row and column lines present regular patterns, most unconventional array access configurations are likely to produce visible patterns in the brightness and the hue of the display that are objectionable to the viewer.

Figure 11:
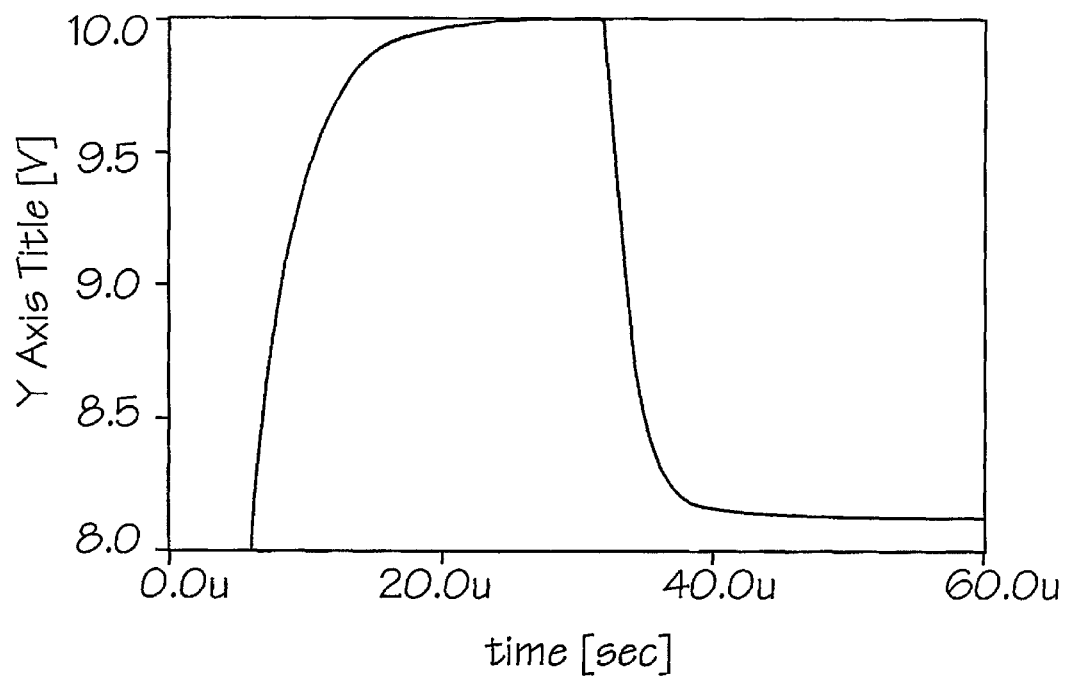
FIG. 11 shows the result of a simulation of the kick-down voltage effect in the liquid crystal cell after the turn-off of the TFT due to coupling capacitance between the cell row and column lines in a typical AMLCD with a 1 mm pixel pitch.
Figure 12A:
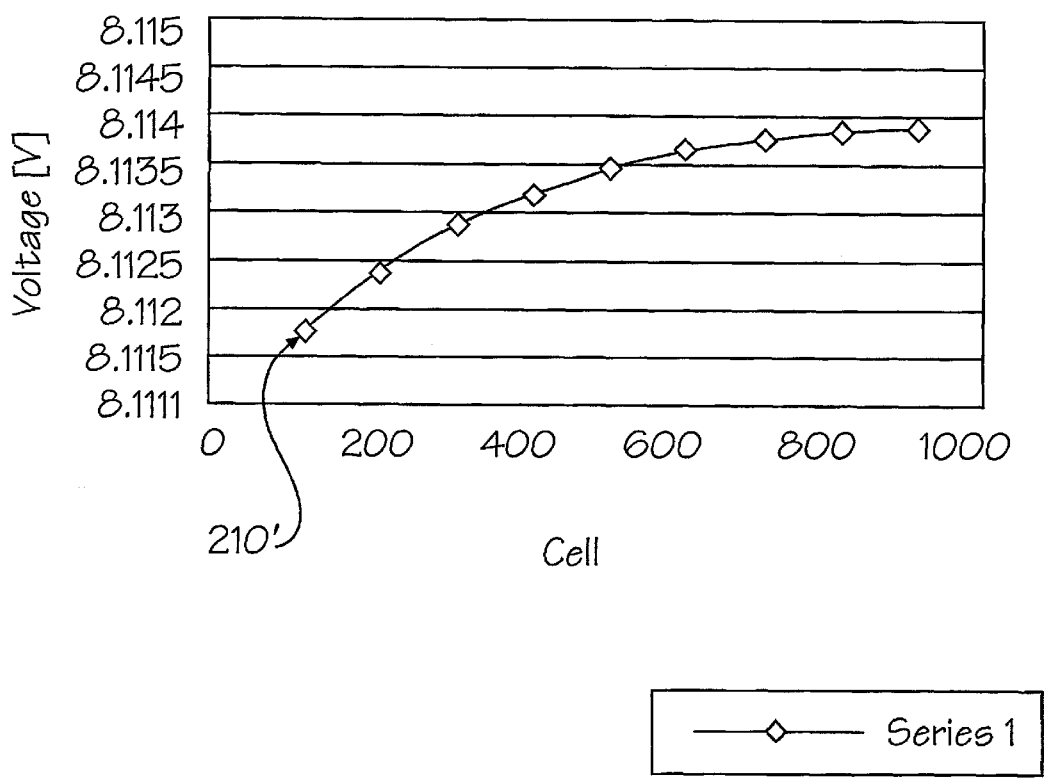
FIG. 12a shows the simulated data voltage for pixels subject to a given excitation level after the voltage kick-down effect as a function of the distance from the driver circuit connected to one edge of the row line.
Figure 12B:
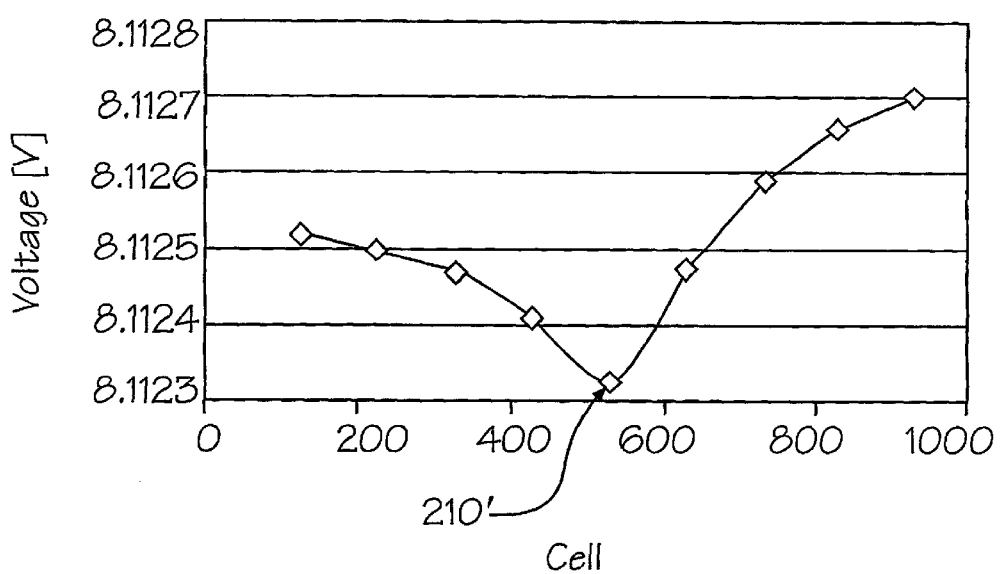
FIG. 12b shows the simulated data voltage for pixels subject to a given excitation level after the kick-down effect as a function of the location of the pixel with respect to the row line tap point located in the middle of the row line.

Techniques are now described for correcting such patterns in large monolithic, monolithic-type, and tiled displays. The kick-down voltage in an AMLCD is used as an illustrative example. To first order the kick-down voltage is determined by the ratio of the local coupling capacitance and the total cell capacitance, multiplied by the magnitude of the voltage swing between the row and column lines, all of which are quantities local to each individual pixel. This effect is shown in FIG. 11. The magnitude of the kick-down voltage is almost 2V in this case. To second order the kick-down voltage also depends on the impedance of the row and column drive circuits as seen by the pixel in question. This impedance is dominated by the distributed capacitance of the row and column lines. Capacitances arise from metal interconnect interactions with other metal interconnect lines on the same or different level, all of which are located on the TFT substrate, or from interactions with the conductive but transparent indium-tin-oxide (ITO) electrodes, one of which is located on the TFT substrate and the other on the CF substrate. Generally, the magnitude of the kick-down voltage of an LC cell increases with the distance of said pixel from the row and column driver chips in a conventional matrix addressed AMLCD with access from two orthogonal edges (FIG. 12a). Tap point 210' corresponds to the cell at the left most edge of the curve (FIG. 12a). Here variation in the final voltage is smooth and no more than 4 mV over the entire row of cells. Hence the variation would not be detectable by a human observer. However, in unconventional access configurations (e.g., single edge access), the magnitude of the kick-down voltage also depends on the distance of the pixel from the row or column tap point 210' (FIG. 12b). Generally, the kick-down voltage is largest in LC cells at the tap points (FIG. 12b), increasing with distance for other pixels. Therefore adjacent pixels may exhibit quite dissimilar kick-down voltage values depending on where their respective tap points are located. Typical amounts for the kick-down voltage variations in today's AMLCDs are below 50 mV.

While such variations for conventional, two-edge matrix addressing are gradual over the pixel array and therefore not necessarily visible, patterns in the magnitude of the kick-down voltages are introduced for unconventional access wiring. Such patterns may become clearly visible during normal drive voltage uniformities in today's AMLCDs. Resistive and inductive line effects have much less effect. Therefore, any compensation or equalization is best done by adjusting either the coupling capacitances or the capacitances in the row and column drive circuits from the driver chips to the pixels. In typical AMLCDs per unit area, metal-to-metal or metal-to-ITO overlap capacitances on the same substrate are about 30 times larger than metal-to-ITO capacitance with a conductor located on opposite substrates. The former types of capacitances are thus more effective in adjusting capacitances.

Figure 13:
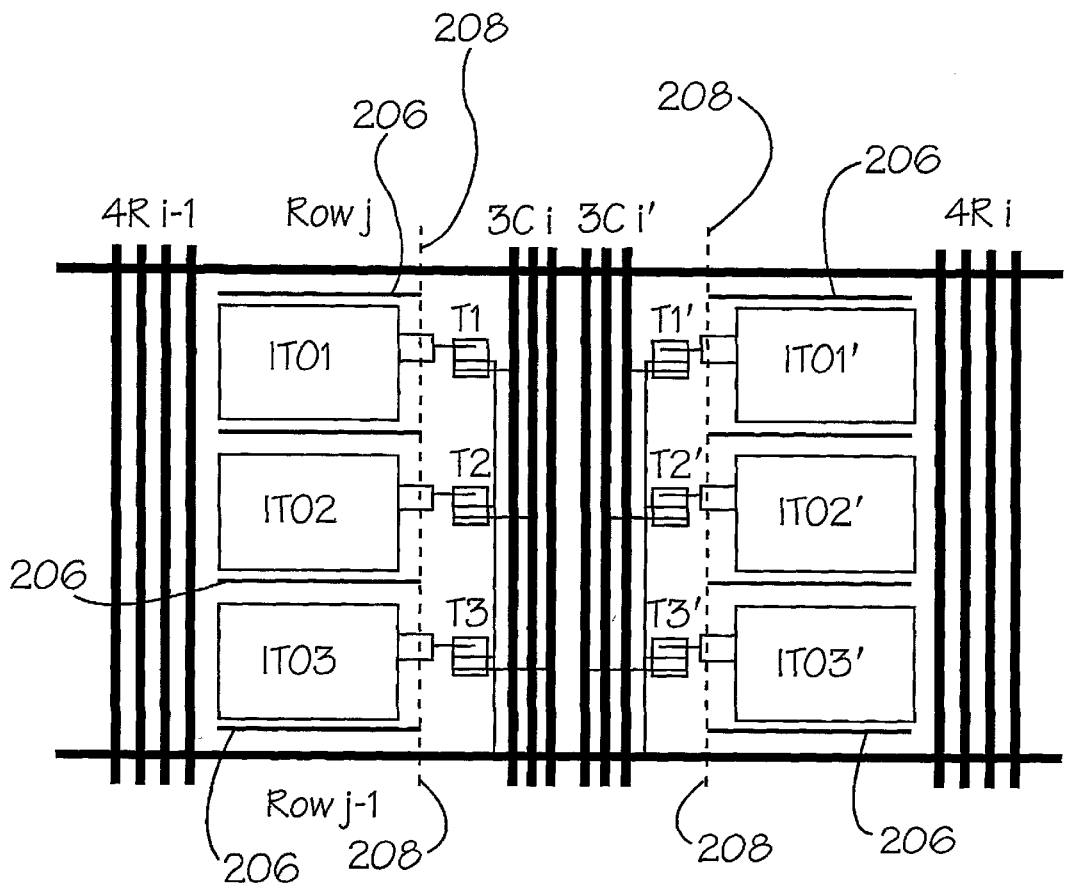
FIG. 13 illustrates the layout of a field shield electrode placed between the liquid crystal cell electrode and thin film wiring in order to equalize capacitive coupling of all LC cells.

The insight discussed above has been verified by extensive circuit simulations for several large AMLCD designs with a pixel pitch on the order of 1 mm. The resulting understanding has led to the following corrective design procedures that can be applied to suppress pixel drive voltage level and waveform variations to a degree that they no longer are visible under the intended viewing conditions of display (i.e., below human luminance and color contrast sensitivity):

1) Design the layout of each sub-pixel aperture such that its capacitive interactions with other proximate conductive materials becomes essentially equal. This can be accomplished by rearranging the layout of the sub-pixel, adjusting distances to proximate conductors, and inserting field shields 206 between the sub-pixel and adjacent conductive structures (FIG. 13). Such field shields 206 may be floating, or be connected to a common return path 208, to a local, global, or shield ground (not shown), or to a global voltage electrode (not shown).

Figure 14:
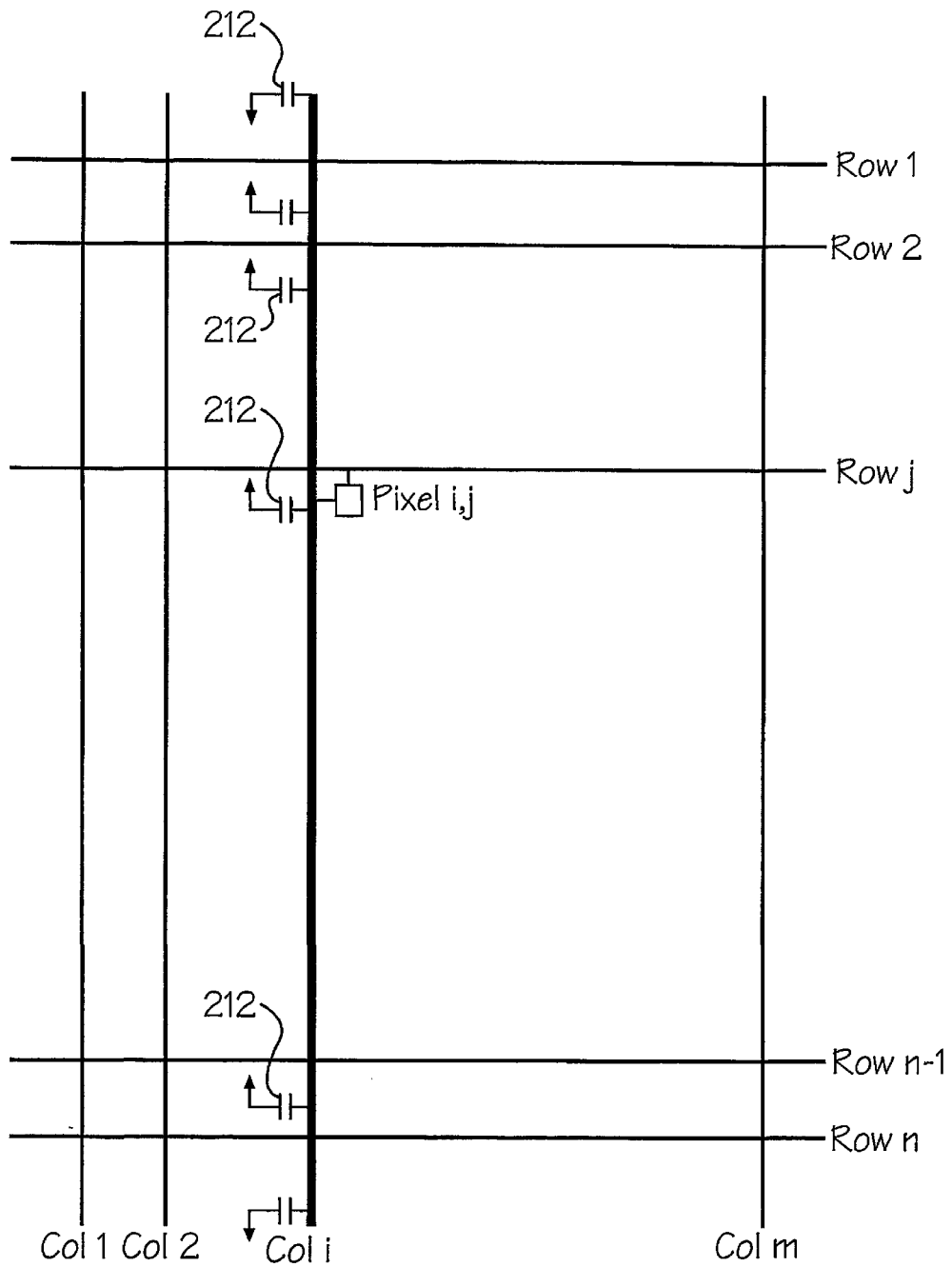
FIG. 14 illustrates distributed or discrete capacitance along column interconnections in order to equalize the apparent capacitance seen by the liquid crystal cells.
Figure 15:
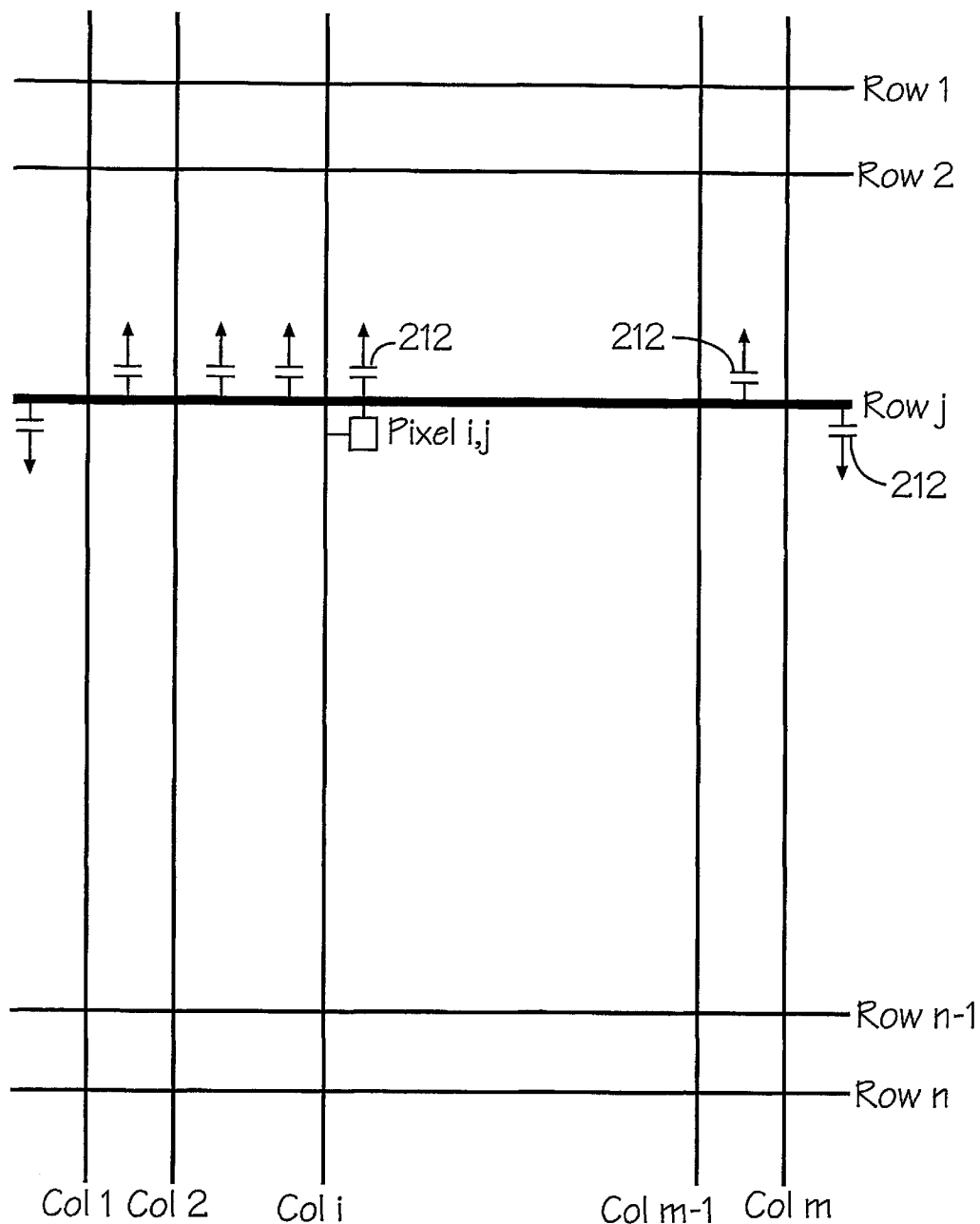
FIG. 15 illustrates distributed or discrete capacitance along a row in order to equalize the apparent capacitance seen by the liquid crystal cells.
Figure 16:
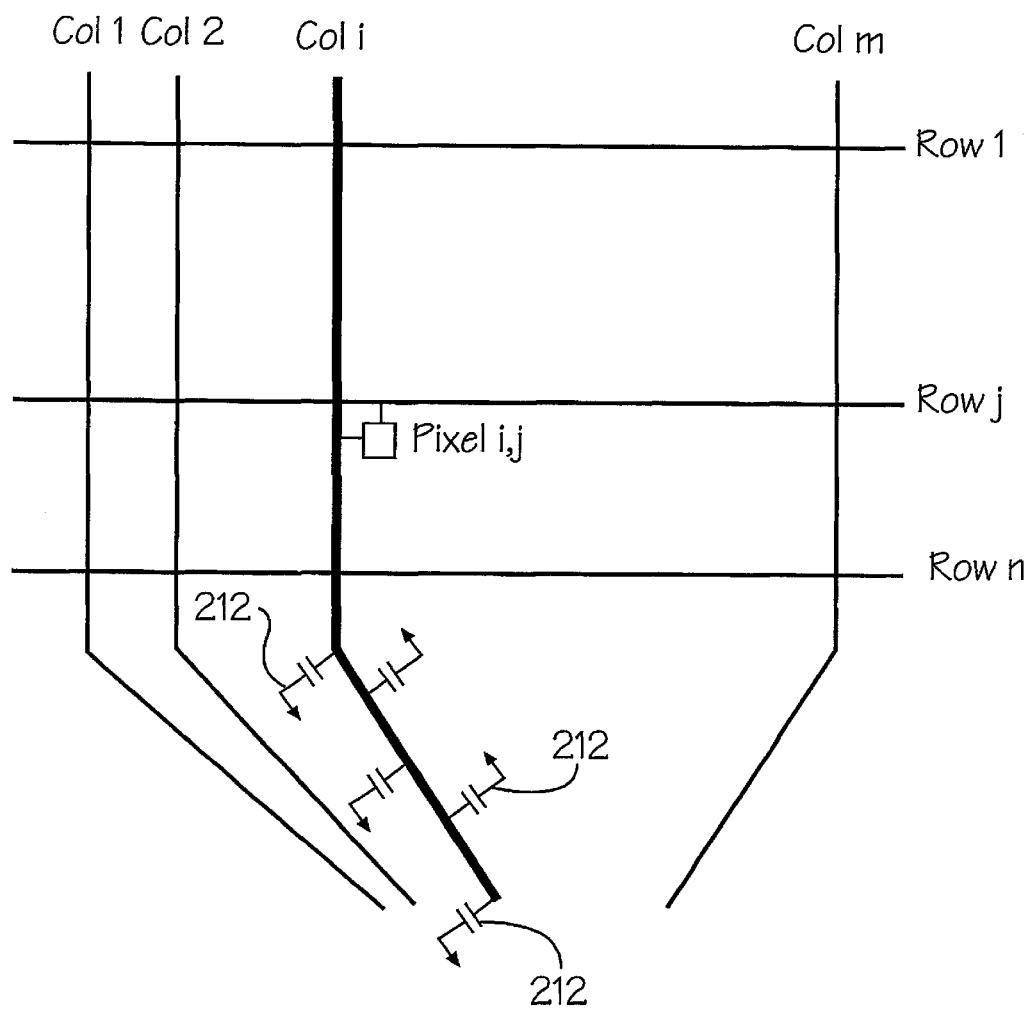
FIG. 16 illustrates distributed or discrete capacitance along column fan-out lines in order to equalize the apparent capacitance seen by the liquid crystal cells.

2) Design the layout of each sub-pixel such that the total cell capacitance, including the LC capacitance and any storage capacitors used to stabilize the cell voltage, as well as the cell-to-row-line coupling capacitance, including TFT gate-to-drain and gate-to-source capacitance, as applicable, are equal in all pixels. The best way to achieve this is to make all cell layouts identical;

3) Equalize all distributed column line capacitance, including line body components, fringing field capacitances, overlap capacitances with other conductors, and any column line-to-column line coupling capacitances by adjusting the line width and line spacing of column lines, possibly by adding small discrete capacitances 212 along the body of the column line (FIG. 14). Metal-to-metal overlaps provide the most area efficient adder. Line-to-line coupling capacitance appears in designs in which multiple column lines run in common wiring channels across the pixel arrays. Such an arrangement is especially useful in tiled displays as described in copending U.S. patent application Ser. No. 09/490,776, but preferably also in large electronically and optically optimized monolithic displays. Line width/space adjustments can be guided by two-dimensional capacitance simulations, which are well known to persons skilled, for example, in the art of integrated circuit design or electronic packaging;

4) Equalize all distributed row line capacitances, including line body components, fringing field capacitances, overlap capacitances with other conductors, and any row line-to-row line coupling capacitances by adjusting the line width and line spacing of row lines, and possibly by adding small discrete capacitances 212 along the body of the row line (FIG. 15). Metal-to-metal overlaps provide the most area efficient adder. Line-to-line coupling capacitances appear in designs in which multiple row lines run in common wiring channels across the pixel arrays. Such an arrangement is especially useful in tiled displays as described in copending U.S. patent application Ser. No. 09/490,776, but preferably also in large electronically and optically optimized monolithic displays. Line width/space adjustments can be guided by two-dimensional capacitance simulations, which are well known to persons skilled in the art of integrated circuit design or electronic packaging;

5) Equalize the distributed row and column fan-out line capacitances that run from driver chips to the edge or row and column lines at the edge of the pixel array (FIG. 16). These capacitances include line body components, fringing fields, and overlap capacitances that depend on the layout of said access lines. While such fan-out lines generally have a very simple layout with few, if any crossovers, in FPDs with two-sided or four-sided pixel array access, layouts especially for single sided access are very complex. Both line lengths and the number and geometry of line-to-line crossovers vary greatly. As a consequence, the total distributed line capacitance also varies. Equalization can be performed by adjusting the width of the line, adjusting the line spacing, and adding additional overlap capacitances 212 over the length of the line. Metal-to-metal overlaps provide the most area efficient adder;

6) Equalize any distributed row or column access line capacitances that are used in the display to connect row or column fan-out lines, respectively, to row and column lines running within the pixel array to implement matrix addressing. These capacitances include line body components, fringing fields, and overlap capacitances that depend on the layout of said access lines. For example, for single edge access, both horizontal row lines and vertical column lines must be accessed from the same edge. If the column line edge is chosen for access, column lines are directly accessible with the column fan-out lines, but separate row access lines are needed, as described in copending U.S. patent application Ser. No. 09/490,776.

Figure 17:
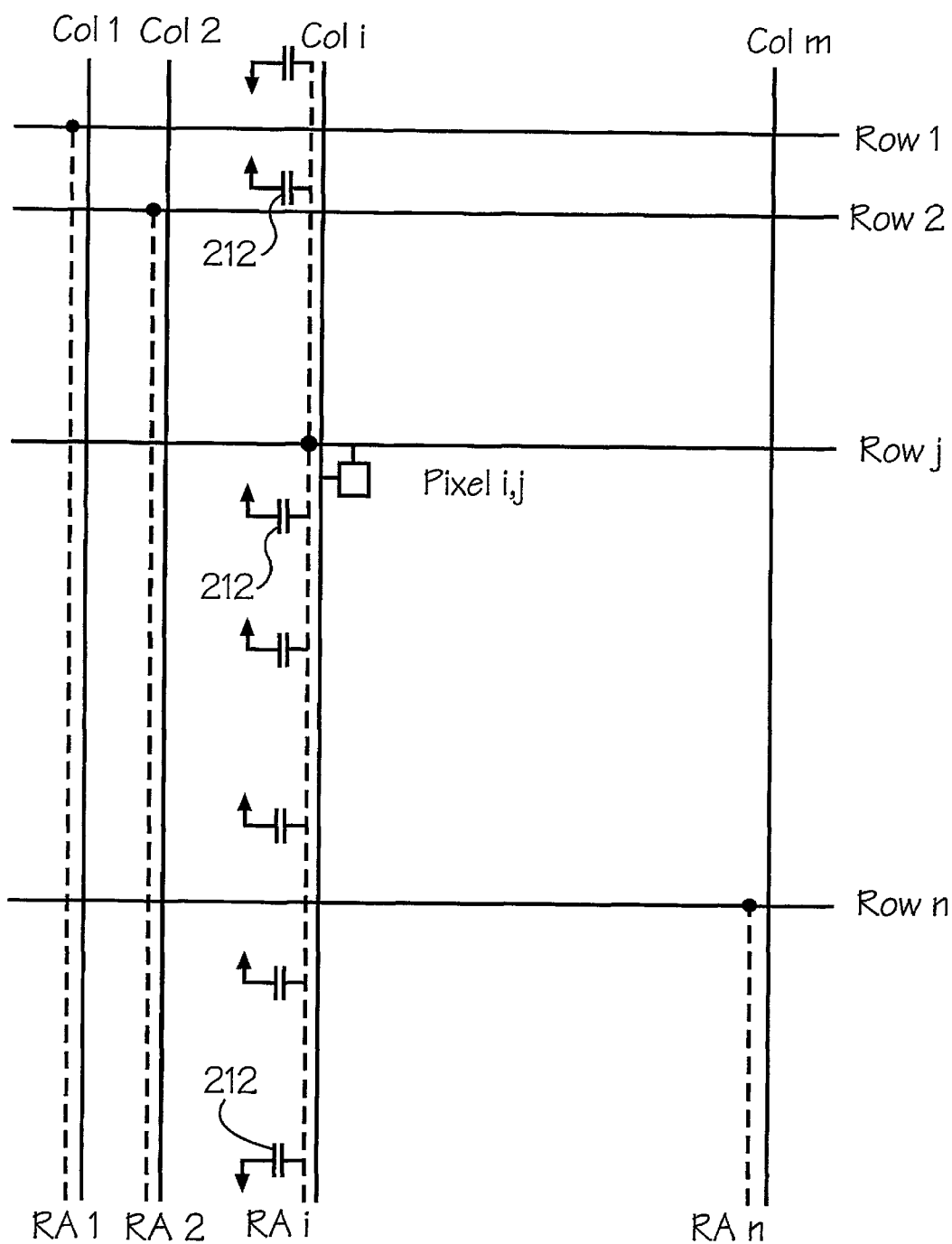
FIG. 17 illustrates distributed or discrete capacitance along row access lines in order to equalize the apparent capacitance seen by the liquid crystal cells.

Such row access lines are routed in vertical wiring channels parallel to the column lines as illustrated in FIG. 17 or grouped together is separate channels (not shown). Each row access line is then connected to one row line at a tap point within the pixel array. As a consequence, row access line lengths vary from zero to the full height of the pixel array. Equalization can be performed by extending row or column lines beyond the tap points, adjusting line width, adjusting line spacing, placing tap points, and adding additional overlap capacitances 212 over the length of the line either in discrete chunks or as a continuous structure. Equalization should be performed such that the row or column drive circuit impedance from the pixels connected to that row or column line becomes closely matched. The first order goal is to match the total capacitance in said row or column drive circuit. The refinements into the amount of added capacitance is best determined using circuit simulation.

Figure 18:
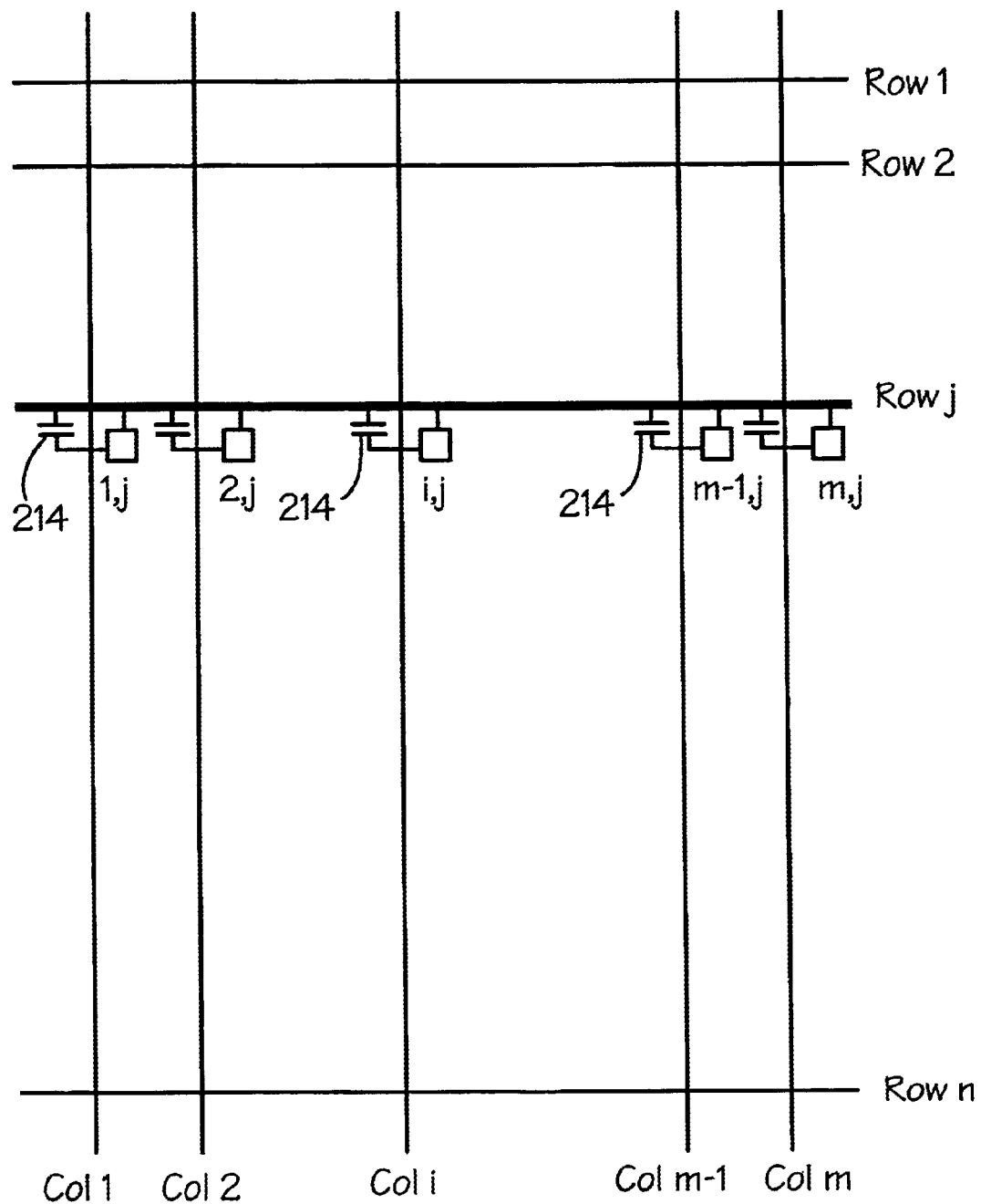
FIG. 18 illustrates the adjustment of row-to-liquid crystal cell coupling capacitance in order to control kick-down voltage variation for pixels along said row line.

Metal-to-metal overlaps provide the most area efficient adder;

7) Another design technique for controlling pixel voltage level and waveform uniformities in large monolithic and tiled displays is based on adjusting the pixel layout as a means for compensation. For example, as stated above, the magnitude of the kick-down voltage in the LC cell decreases with the distance to the tap point or the output lead of the driver chip, whichever is directly connected to the row line. On the other hand, the magnitude of the kick-down voltage is proportional to the coupling capacitance between the LC cell and the row, and possibly column, lines. Therefore, a reduction of the variation of the kick-down voltage with position can be compensated for by increasing the coupling capacitances 214 monotonically with distance from the tap point or driver chip output lead (FIG. 18). Similarly, the coupling capacitance can be decreased as a function of cell location, thus reducing the variations in the magnitude of the kick-down voltages. Such coupling capacitance adjustment strategies can be combined with appropriate placement of tap points and routing of access and fan-out lines.

Figure 19A:
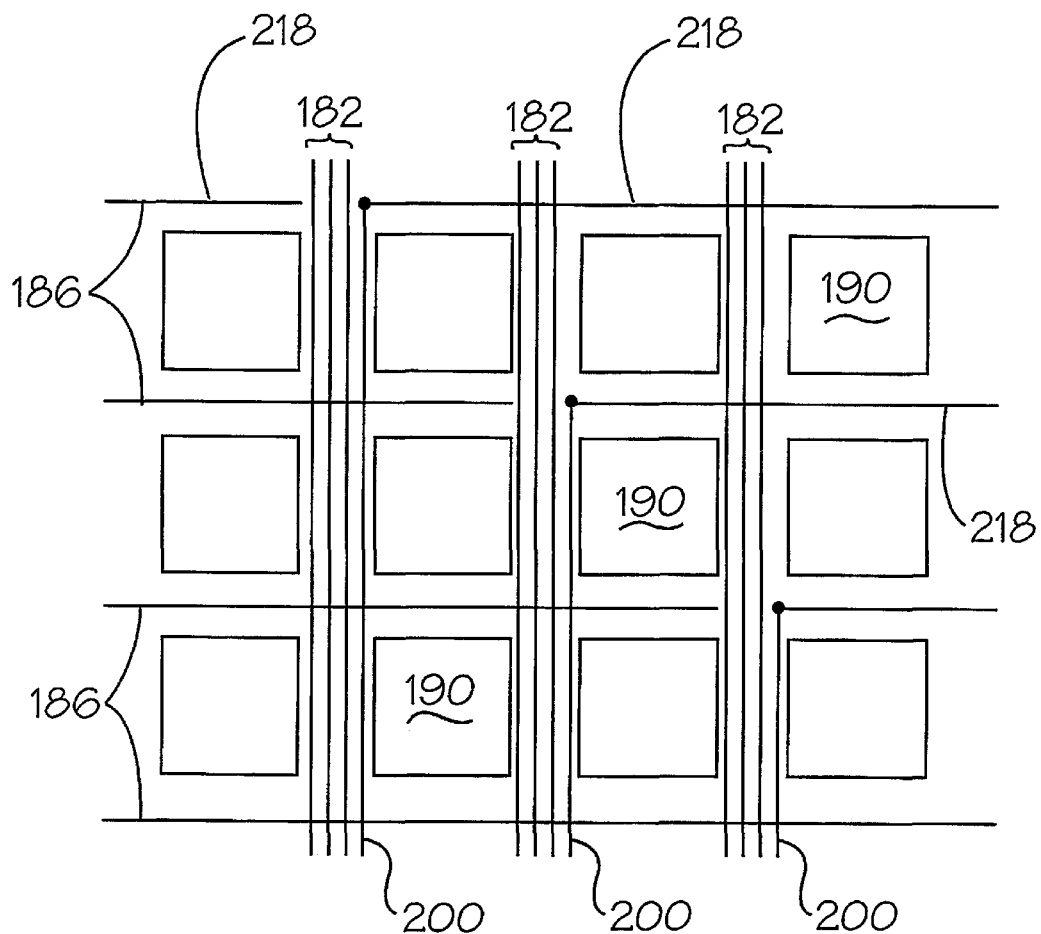
FIG. 19a shows a segmented row line served by multiple row access lines for single edge access in order to minimize the separation of pixels and driver circuit or tap point.

8) As a final measure, row, column, or row and column lines can be broken into multiple row segments 218 (FIG. 9a), and/or multiple column segments 220 (FIG. 9b) Additional row and column access lines 200, 202, respectively can be provided to serve each segment. Such an arrangement can reduce the distance of pixels from driver circuits or tap points and thus effectively decrease interconnection length dependent visual artifacts and/or non-uniformities at the cost of adding additional driver circuits. An illustration of such a segmented row line with multiple row access lines is shown in FIG. 19a.

Figure 19B:
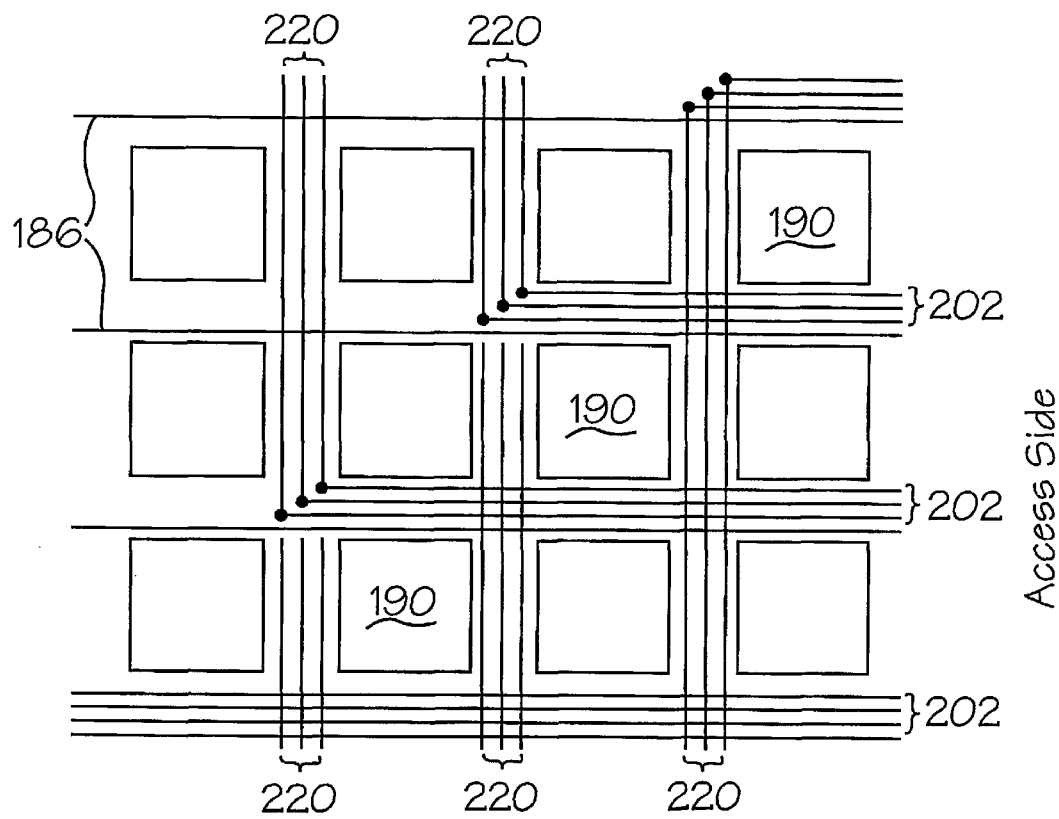
FIG. 19b shows a segmented column line served by multiple column access lines for single edge access in order to minimize the separation of pixels and driver circuit or tap point.

Similarly, an arrangement with segmented column lines 220 is shown in FIG. 19b. It will be obvious that either row or column line segmentation may be used individually or both row and column lines may be segmented. The use of interconnection segmentation allows fabrication of larger display sizes. This procedure extends the operation of the display beyond the thin-film RC time constant delay limit. In the RC domain, interconnect delays are determined by the square of the length of the segments. Once these RC-delay increase to a significant fraction of the line time, which is on the order of 30 us for 60 Hz frame rate and 480 lines, the display can no longer operate.

These measures change the shape of the LC holding voltage curve as a function of position. The holding voltage curve can also be moved up or down rigidly, if the same amount of capacitance is deducted or added from the coupling capacitance of the sub-pixels along a chosen row line. The easiest way to enhance or lower the coupling capacitance is to increase or decrease, respectively, the area of the overlap between the row and column lines serving the sub-pixel in question. Alternatively, the gate-to-drain overlap capacitance, can be used to adjust coupling capacitance or additional overlap capacitances can be placed into the dark areas of the sub-pixels. Whichever way is chosen, all approaches lead to relatively simple changes in the layout of the sub-pixel or pixel.

Figure 20:
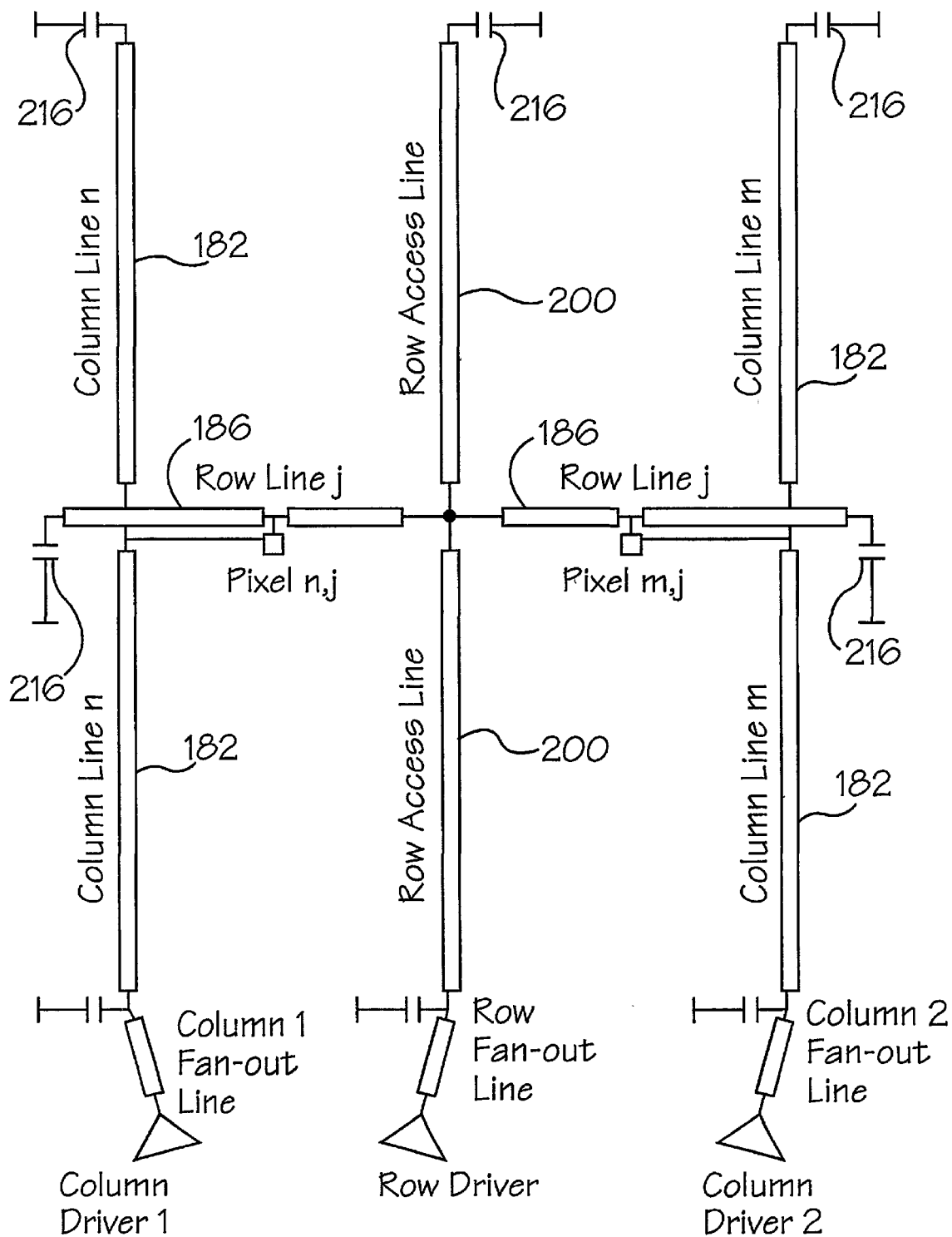
FIG. 20 depicts a system level circuit diagram for two AMLCD cells with single edge addressing for use in circuit simulation of equalization of cell voltage levels and waveforms.

Circuit simulation is a preferable approach to choose which of the above capacitive equalization techniques to implement and optimize parameter values for circuit elements. A typical circuit diagram for these simulations is given in FIG. 20. Simulations can predict drive voltage level and waveform variations and the emergence of any electronic gradients, steps, boundaries, or patterns over the pixel array. Given such a model, the circuit simulator, in combination with measured electrical data for the display, or alternatively simulated electrical data derived from two-dimensional electromagnetic field or device simulations, can be used to evaluate and fine-tune each of the above capacitive equalization techniques for the large monolithic or tiled FPDs in question. The required circuit, electromagnetic field, and device simulation tools are well known to those familiar with modern integrated circuit or electronic packaging design techniques.

The above non-uniformities originating from the details of the underlying electronic circuits are all second order effects that may or may not be fully suppressed below the visual threshold of a critical viewer.

It may be desirable to use additional luminance and chromaticity correction techniques and algorithms for smoothing visual artifacts in order to reach the final image quality level in a large monolithic or tiled display. A conservative approach is to make the correction data memory so large that every pixel can be corrected. This may still be economical for SDTV consumer applications with 852×480 pixels but may become impractical in HDTV AMLCDs with pixel array sizes of 1280×720, 1920×1080, or in larger formats. Hence, it will be advantageous to implement many of the above capacitive equalization techniques, so that the amount of brightness and color correction electronic circuitry and corrective computations required do not exceed the cost budget allocated for these functions.

Figure 21:
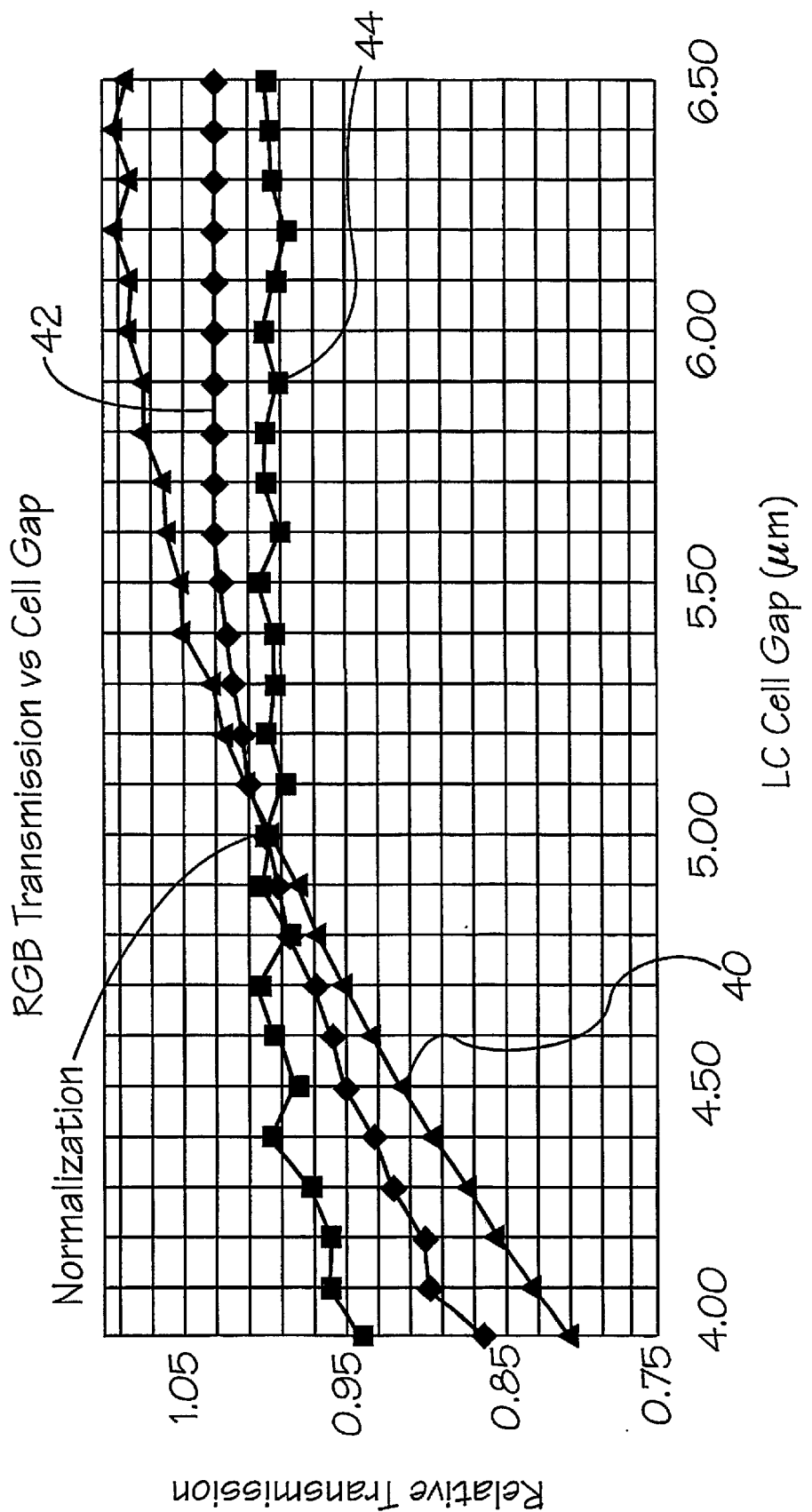
FIG. 21 shows the normalized transmission (proportional to luminance) of liquid crystal cell as a function of cell gap for typical red, green, and blue light.
Figure 22:
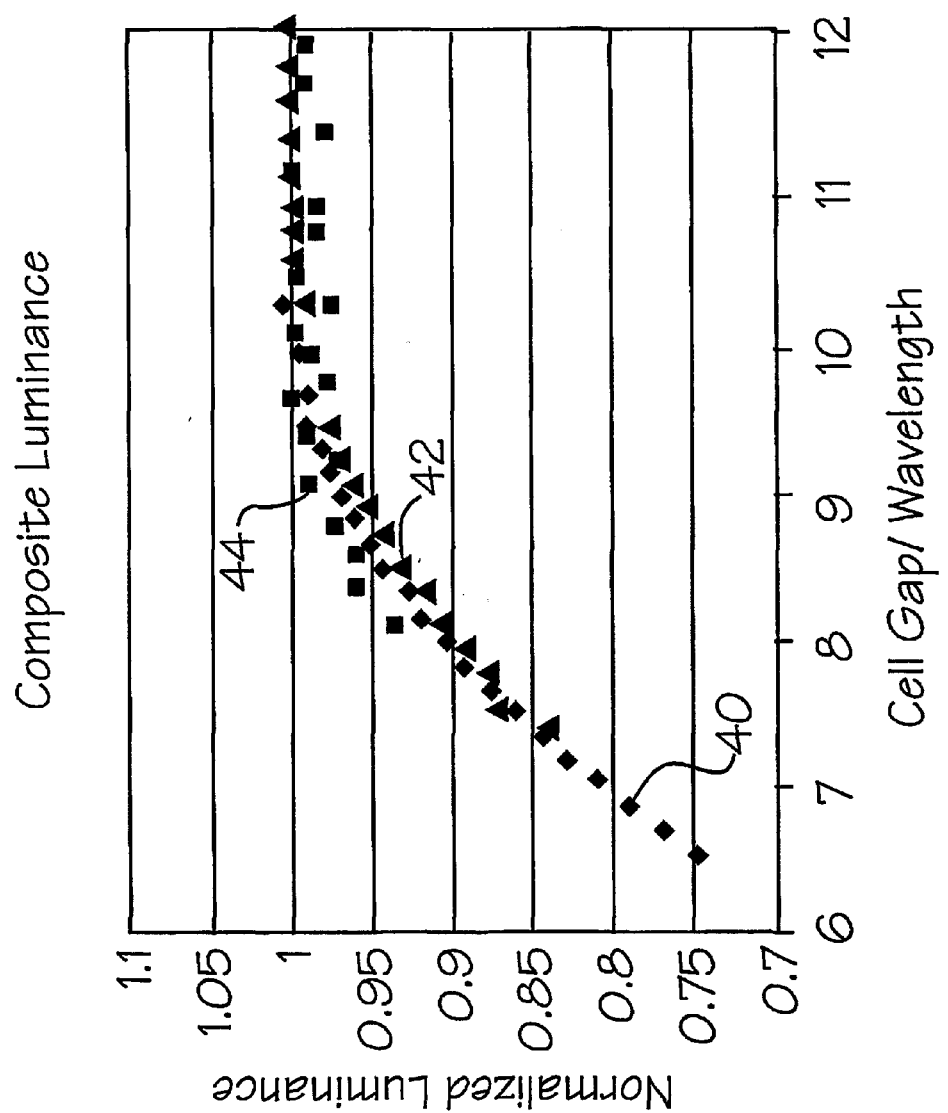
FIG. 22 depicts the normalized luminance of a typical LC cell as a function of the cell gap height-to-wavelength ratio.

In FIG. 21, the typical simulated normalized luminances of the sub-pixels in an LCD cell are plotted as functions of the cell gap for red 140, green 142 and blue 143 light with wavelengths of approximately 612, 542, and 487 nm, respectively. The cell gap is the fundamental parameter that locally determines the optical retardation of light rays passing through the color valves and the light flux emanating from the cell. Therefore, the balance between the primary color fluxes (color balance) changes spacially as the cell gap varies. Now referring to FIG. 22, the typical simulated normalized luminances of the sub-pixels in an LCD cell are plotted as a function of the optical length of the cell gap for red 140, green 142 and blue 144 light with wavelengths of 612, 542, and 487 nm, respectively. The optical length is here defined to equal the ratio of cell gap to the wavelength of light. In this normalized representation all colors exhibit universal behavior.

Figure 23:
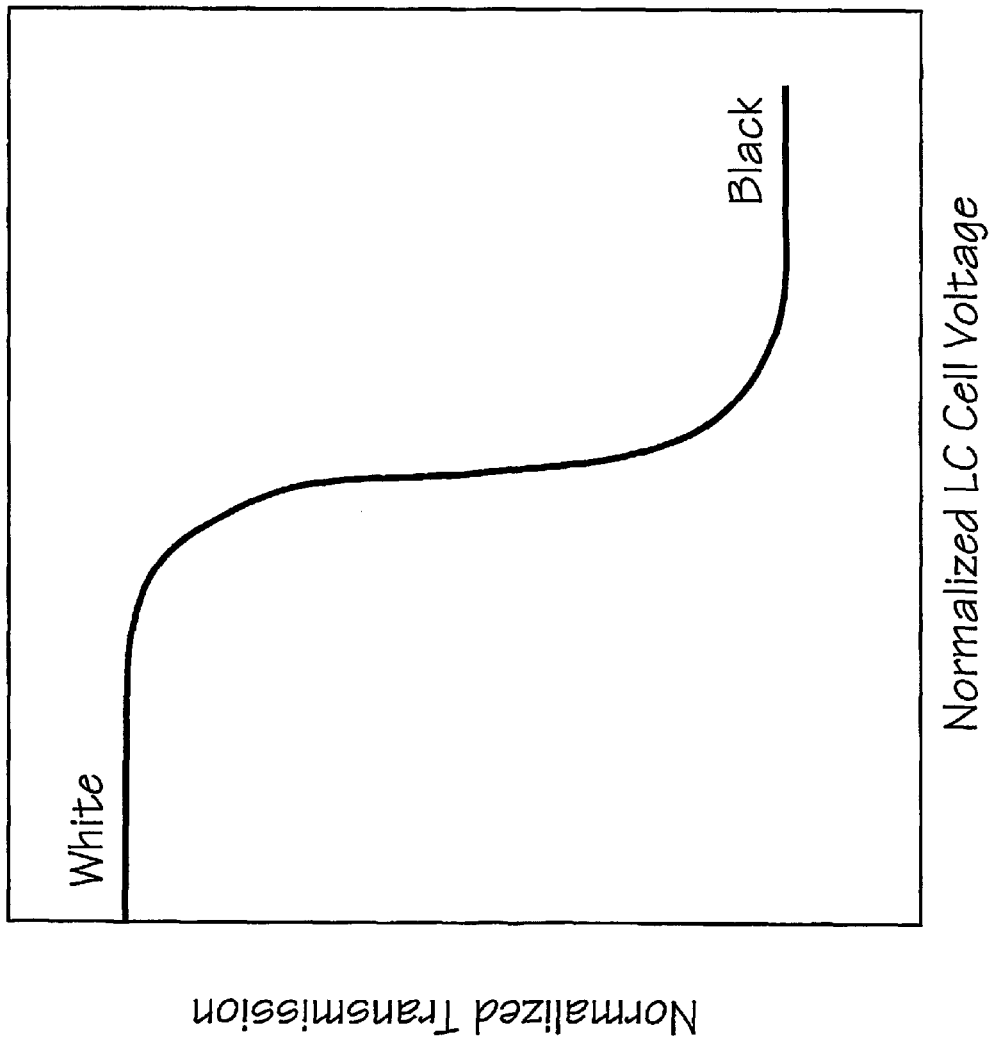
FIG. 23 illustrates a normalized effective T-V for an LC cell in a typical AMLCD.

Therefore, it is desirable to correct pixels with slightly different effective T-V curves (FIG. 23) and other small optical, electro-optical, ambient light, electronic, mechanical, or material anomalies over the pixel array of the display by changing the drive signals, in order to make their appearance more uniform across the large monolithic display. Since the non-linear LC T-V curve is usually linearized via the design of the column driver circuits, the digital data signals can be altered to compensate both for LC T-V curve and column driver output voltage-to-input data characteristics. Such corrections can be done either by matching or blending the absolute luminance and chromaticity values defined in the nominal design, or by matching and/or blending the relative luminance and chromaticity values of one or multiple reference areas on the display, preferably located in the interior of the large array of pixels. Consequently, absolute or relative luminance levels of the sub-pixels close to the boundaries of non-uniform luminance or chromaticity varying areas are within the visual perception threshold of the nominal design or reference area specifications of pixels in the interior of the AMLCD. Therefore, input data for each pixel according to this invention is replaced with new data from a correction procedure. This new data is sent to commercially available column (data) driver chips connected electronically to the liquid crystal display in the conventional manner. Any correction data is calculated in advance by applying the inverse of the transfer function to the domain of the input data or input code range. The correction data may be different for each pixel or group of pixels of the display, thus accounting for the difference in the characteristics of each pixel. In some cases additional resolution for the correction data or the drive signal data may be needed to correct the display to a level at which artifacts are suppressed below visual thresholds. Such extensions will be immediately apparent to those skilled in the art.

A lookup table is one possible implementation for such a correction algorithm. Fortunately, such a correction scheme would result in a design that, if necessary, could be implemented economically for a large number of pixels using present state-of-the-art electronics. However, it is preferable to describe the deviations in the effective T-V curves of the sub-pixels in a manner that greatly reduces the amount of data that must be stored and accessed, as well as the amount of computation that must be performed for the video signal corrections during display operation. A knowledge of the mechanisms discussed herein focuses the physical design of the display and the gray scale color shifts to minimize the amount of correction.

A large variety of mechanisms causing luminance and chromaticity variations in tiled FPDs and the correction methods for them have been disclosed in the copending patent application, Ser. No. 09/369,142. The mechanisms giving rise to artifacts in monolithic displays discussed above may be corrected by applications of software and electronics with substantially identical methods. For convenience to the reader, a brief summary of these correction methods is provided below, suitably modified to apply to large monolithic displays.

It is known that the effective transmission-voltage (T-V) curves or gamma curves for AMLCDs, whether representative of the nominal design or differing from it because of reasons described above, are continuous functions. Therefore, the differences between a deviant and the nominal effective T-V curve is not only a continuous function, but generally a rather smooth function on the scale of the least significant bit of the data driver. Such a shift leaves the white and black states essentially unchanged but greatly affects gray scale levels in between for each sub-pixel; hence, through the mixing of the primary colors, also affects the color balance. This may result in a pixel dependent color space.

Since it is assumed that the deviations of the effective T-V curves from the nominal vanish for white and black fields (an assumption that is usually justified because of the basic operation mechanism of the LC cell), an effective T-V curve or the difference between two effective T-V curves can therefore be described or approximated by dividing the domain of the function (or input code range) into finite pieces, and then describing each piece in a simple manner that is easy to compute in real time. Because of the smoothness and the generally small deviations from the nominal, one possibility is to describe each piece by a linear function (piece-wise linear approximation). Then only the slope and offset need be stored to describe each piece. Consequently, the inverse transfer function (correction) for each piece would also be a linear function for each pixel or set of essentially identical pixels on the large monolithic display.

Because individual LCD panel areas are made from multiple continuous sheets of material, such as glass and organic films, the deviations in the cell gap or other physical properties vary in a smooth and continuous manner compared to the pixel pitch (typically on the order of 1 mm or less in large displays). Therefore, these deviations may also be described using "contour mapping" or similar means to group regions of pixels or bands of pixels in a display that have transfer functions whose differences, compared to the nominal design, are imperceptible to a human viewer. Then, the transfer function for all pixels within a region or band could refer to one copy of a transfer function that represents the entire region or band. The corresponding inverse transfer functions could then be either simple or complex; however, since a number much smaller than the pixel count would be needed, such a correction scheme could be implemented using a practical amount of electronic hardware.

It is also known that effective T-V curves for AMLCDs, whether representative of the nominal design or deviating from it because of reasons discussed above, have a very similar functional form. Therefore, a small number of reference T-V curves could be described in great detail, for example by using comprehensive lookup tables, as is done to define the T-V curves of commercial LCD driver integrated circuit chips. This small number of effective T-V curves of commercial LCD driver integrated circuit chips could be used to describe a much larger number of pixels by assigning labels to such T-V curves, and then developing a table of matching labels for the pixels. The characteristics of each pixel on the large monolithic display would be measured and compared with the reference effective T-V curves, and the label of the closest matching T-V curve would be selected.

Figure 24:
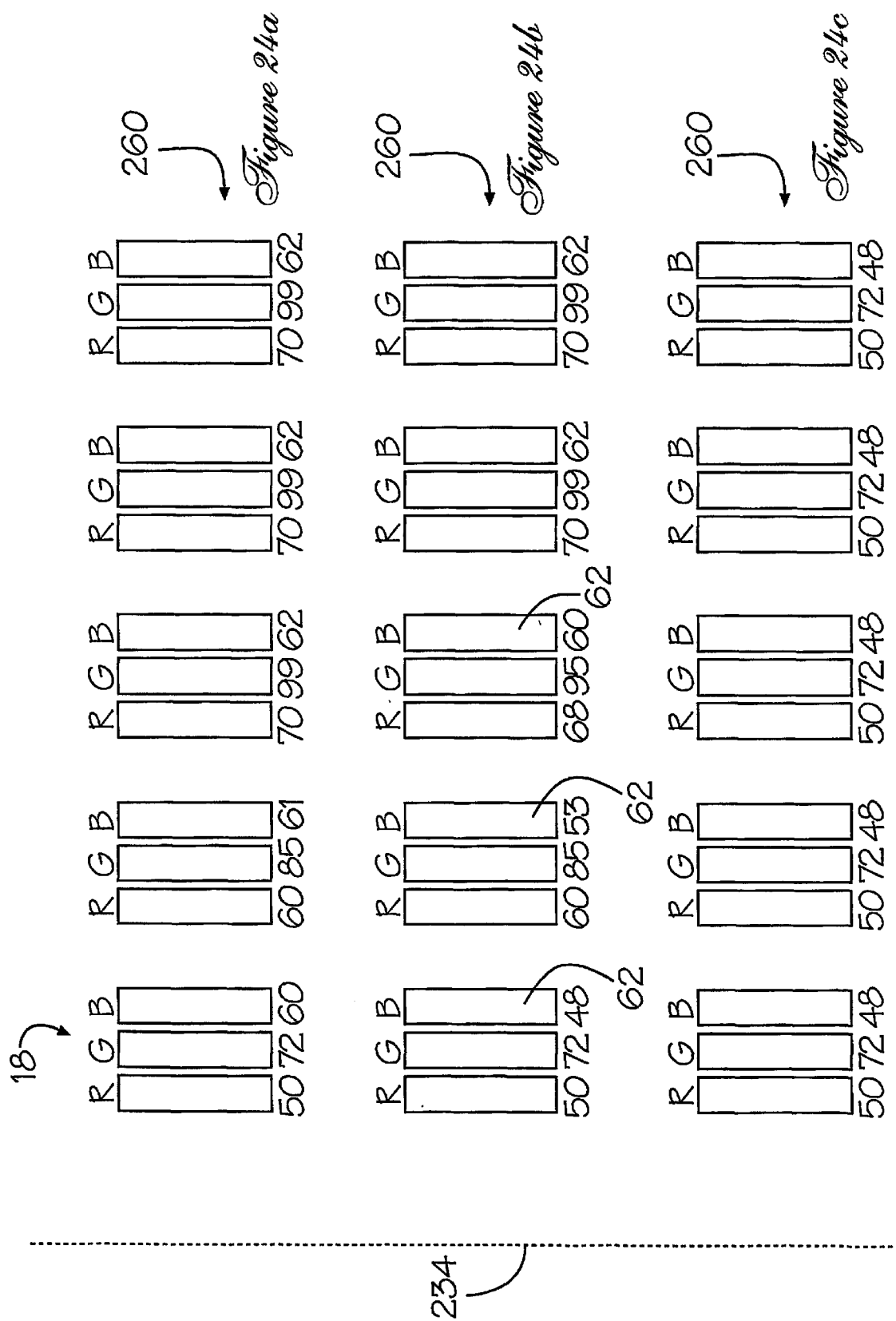
FIGS. 24a–24c show the normalized brightness data values for a row of pixels, FIG. 24a for a row of RGB sub-pixels for uncorrected data, FIG. 24b for a row of RGB sub-pixels for corrected data and FIG. 24c for a row of RGB sub-pixels corrected for uniform luminance.

FIG. 24a depicts the relative brightness values of RGB sub-pixels in a row of pixels from a boundary of an area of color non-uniformity in a large monolithic display. A uniform gray scale combination defines the input signals to the primary color sub-pixels. The boundary 234 is positioned to the left of the pixel row 260 in this FIGURE and for example may be a contour line 170, 172, 174 in FIG. 8. The relative brightness values have been normalized into the usual 8 bit range (0–255). The RGB signal values in the interior of the area of color non-uniformity, 70, 99, 62 respectively, correspond to the nominal drive signal values for this sample gray scale field. No corrections have been applied to the pixels in FIG. 24a.

The corrections are applied in two steps: first considering hue and second brightness. It is desirable to maintain the ratio of the relative brightness of blue to green and red to green over the entire display (hue correction) so that no discoloration becomes apparent to the viewer.

The color corrected relative brightness values are illustrated in FIG. 24b, where the relative brightness ratios between the primaries have been maintained approximately to the precision of the least significant bit. Electronic controls in color displays typically allow for 8 bit or 256 levels of "gray" for each primary color. The corrections should be performed to the frame buffer onto the frame data presented to the display. This eliminates boundaries related to hue variations or non-uniformities over the large display. However, these corrections do not restore the display to uniform luminance for uniform gray scale drive signals, because the sum of the relative contributions to brightness varies over the entire display as shown in FIG. 8.

FIG. 24c shows the relative brightness values of all the sub-pixels after they have been corrected for uniform luminance levels. This correction can be achieved by applying a correction bit map image (not shown in this FIGURE) to each incoming frame before the latter is sent to the data drivers (usually column) of the display. All pixel data can then be changed in accordance with the teachings of this invention. Sub-pixel data is adjusted such that the spectral output from the display is that of the desired hue and brightness uniformly across the entire pixel array of the display.

Figure 25:
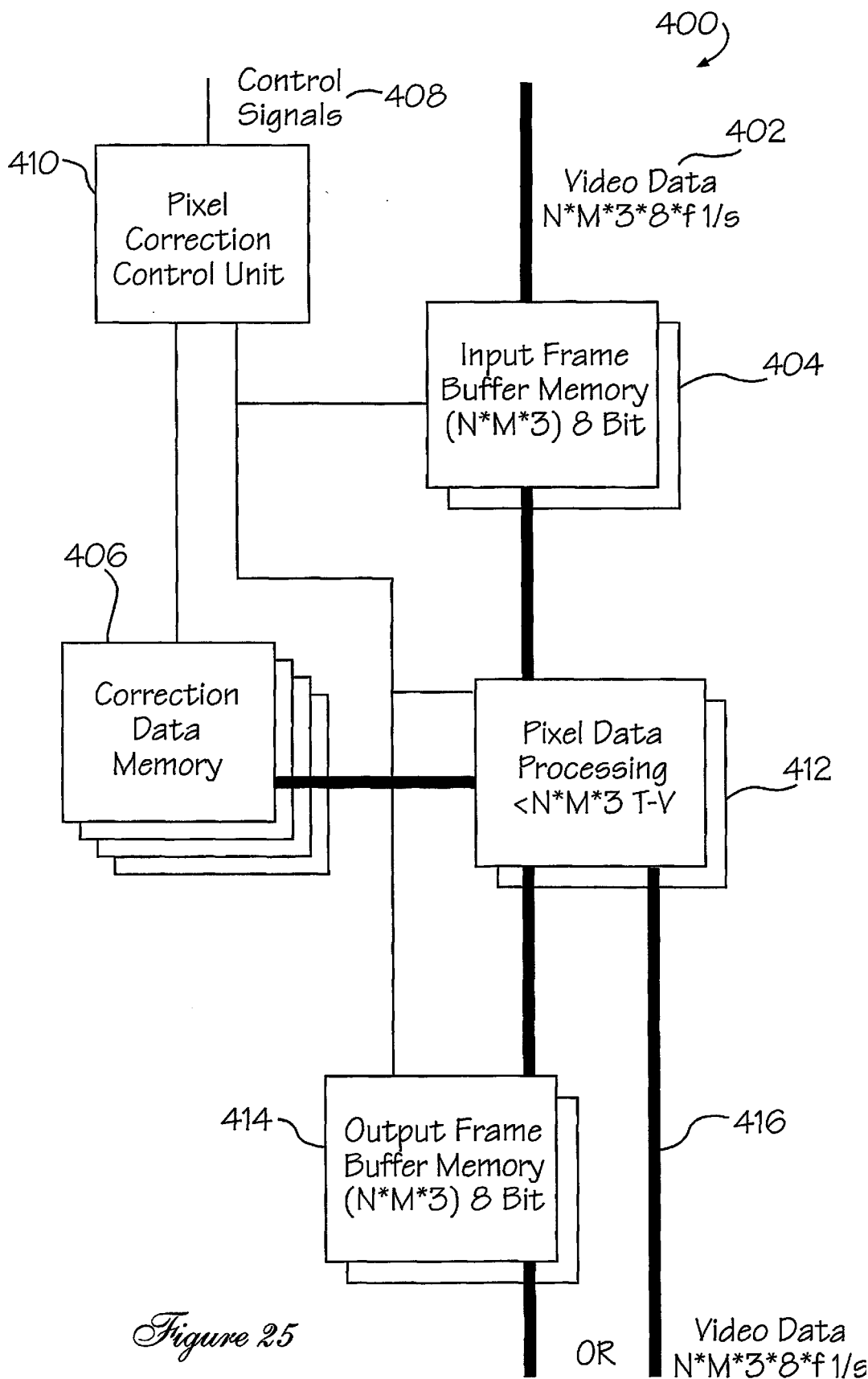
FIG. 25 illustrates a block diagram of one embodiment of a luminance and chromaticity correction circuit controlled by pixel correction control unit for a single pixel, sets of pixels, or all pixel corrections.

Now referring to FIG. 25, an illustration of the block diagram level implementation of the general correction procedure for 24 bit color is shown, 400. Implementations for other color resolutions are similar and immediately obvious to those skilled in the art. Incoming video data 402 is first temporarily stored in an input frame buffer memory 404. The video data 402 is read from the input frame buffer memory 404 and correction data from correction data memory 406 under the control of control signals 408 and a pixel correction control unit 410 is applied to a pixel data processor 412. The correction data memory 406 should be composed of non-volatile memory, or of volatile memory initialized to values stored in auxiliary non-volatile memory, or be initialized with values calculated from values stored in non-volatile memory. This ensures that correction data is not lost when the display is powered down. The appropriate corrections to the pixel video data are then applied by performing electronic pixel data processing using one or more processing units 412. Since both incoming and corrected video data for each sub-pixel comprises a single n-bit integer number (usually 8-bit), all pixel data processing needs be done only to n bit precision. Once pixel data has been corrected, it can be sent directly into the display. In an alternate embodiment, the pixel correction control unit 410 is merged with the pixel data processing unit 412. In yet another alternate embodiment, corrected pixel data is collected into an output frame buffer memory 414 before it is sent to the display.

Sub-pixel data corrections can be accomplished in many ways. In one embodiment, sub-pixels are grouped according to their effective T-V curve response and then each group is assigned a previously stored response function specific to that group. Groups could, for example, include interior area sub-pixels for each bounded substantially uniform area and edge pixels for each inner and outer edge of each boundary. As long as the number of groups is reasonable, the amount of data for the response functions that must be stored in the correction data memory 406 is acceptable.

Figure 26A:
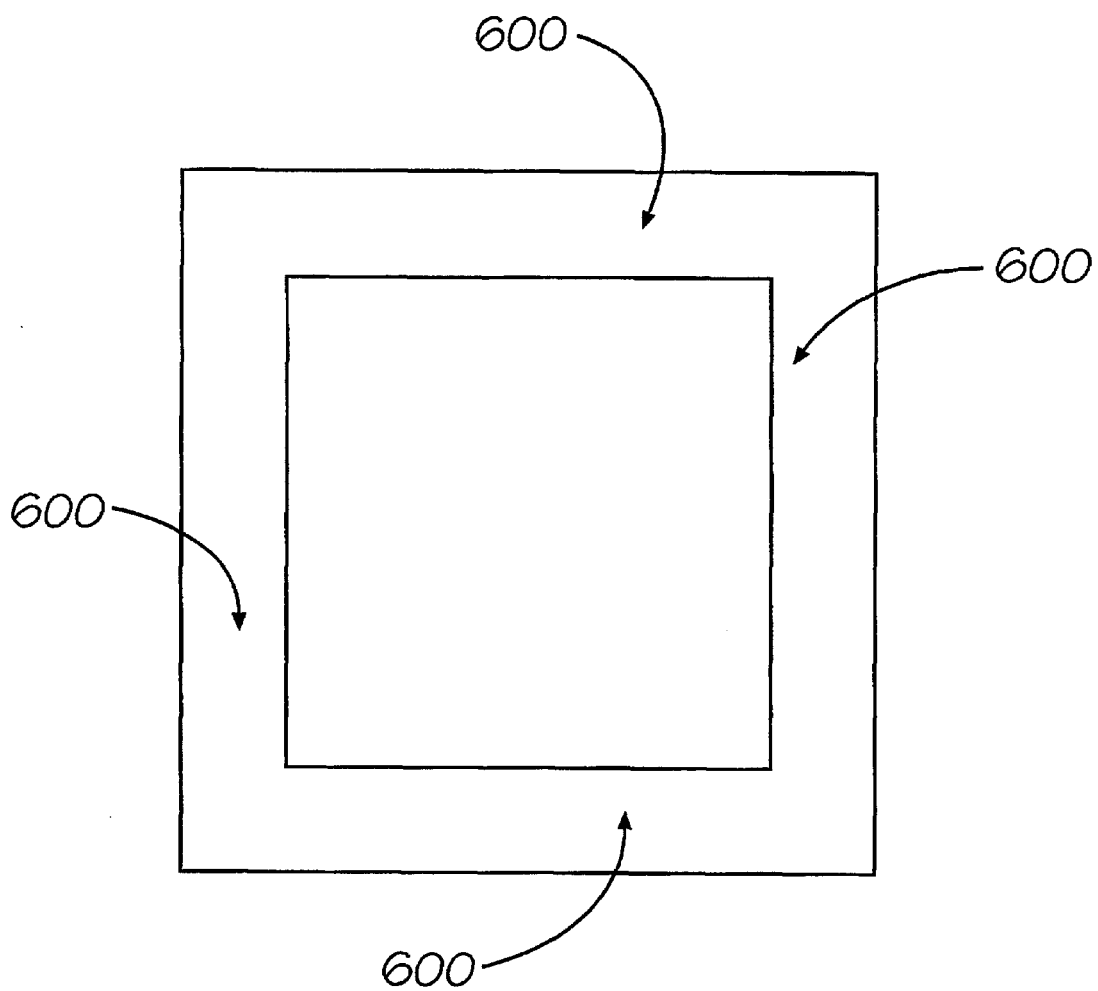
FIG. 26a shows a floor plan of a pixel array having a wide surrounding rim area on all four sides.
Figure 26B:
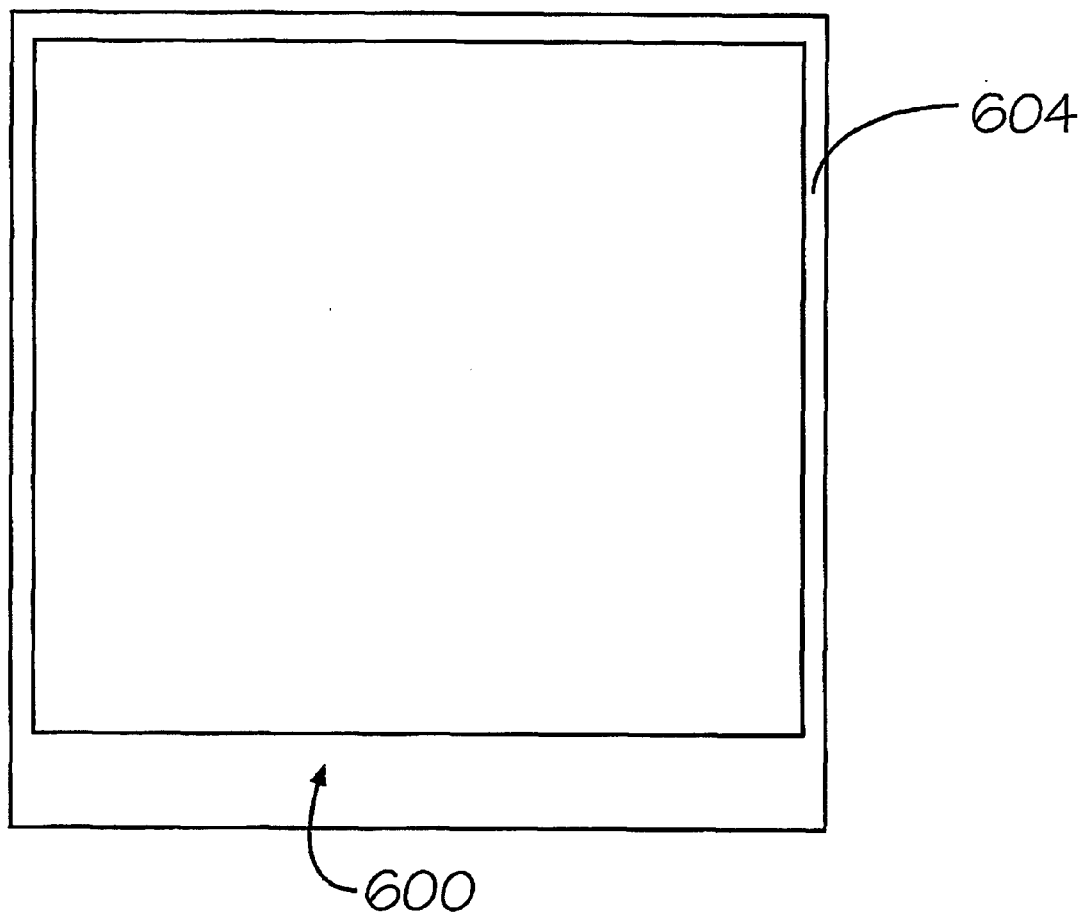
FIG. 26b shows a floor plan of a pixel array having a wide surrounding rim on one side with narrow rims on three sides.
Figure 26C:
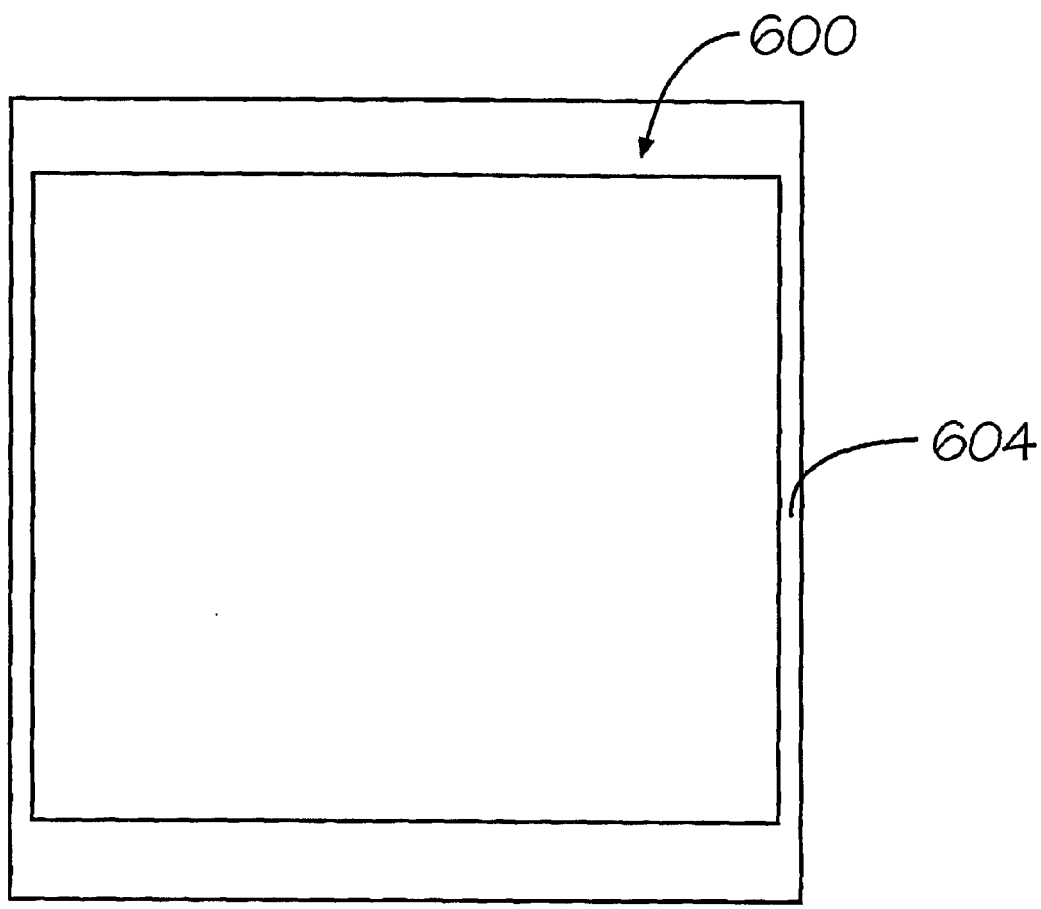
FIG. 26c shows a floor plan of a pixel array having a wide surrounding rim on two sides and narrow rims on two sides.

An additional benefit arising from single or two-sided matrix addressing impacts the form factor of the display housing. Conventional matrix addressed displays with two adjacent sided access, or four sided access, require the fabrication of a fan-out wiring pattern and electrical connections on two or four sides of the display substrate. As a consequence, the perimeter or rim outside the pixel array becomes large 600, which requires a larger size for the display housing and gives the display a bulky appearance (FIG. 26a). With single sided wiring, the width of the rim only along one edge 600 has to accommodate fan-out patterns and corrections, while the width of the rim in the three other directions 604 is determined by the seal width and housing only (FIG. 26b). Similarly, for two-sided access on two opposite sides, two narrow rim sides 604 can be realized (FIG. 26c).

Since other modifications and changes varied to fit particular operating conditions and environments or designs will be apparent to those skilled in the art, the invention is not considered limited to the examples chosen for purposes of disclosure, and covers changes and modifications which do not constitute departures from the true scope of this invention.

Having thus described the invention, what is desired to be protected by Letters Patent is presented in the subsequently appended claims.

What is claimed is:

1. In a monolithic, or monolithic-like, AMLCD having improved mechanical stiffness and controlled contrast, luminance and chromaticity across a wide range of view angles, and comprising a liquid crystal display element comprising pixels disposed in a two-dimensional array organized into rows and columns, each of said pixels comprising at least one sub-pixel, and support means comprising at least one from the group of cover plate and back plate affixed to and extending beyond said two-dimensional array of pixels, the improvement comprising means for compensating for non-uniformities by selectively altering said pixel stimulation signals responsive to said non-uniformities, whereby variations in luminance and chromaticity of modified, transmitted light from said pixels are reduced below a predetermined perceptual threshold.

2. The monolithic, or monolithic-like, AMLCD display in accordance with claim 1, wherein said non-uniformities are selected from the group of:

electronic boundaries, lighting effects, birefringence, stress effects, temperature, ambient light, view angles, viewer preference, optical stack, mechanical deformation, and spacer balls.

3. The monolithic, or monolithic-like AMLCD as recited in claim 1, wherein said pixels comprise sub-pixels, and said pixel stimulation signals comprise sub-pixel stimulation signals, each of said sub-pixels being adapted to transmit light having a distinct, predetermined chromaticity and luminance upon stimulation by a corresponding sub-pixel stimulation signal, and said means for selectively altering said pixel stimulation signals comprises means for altering said sub-pixel stimulation signals.

4. The monolithic, or monolithic-like AMLCD as recited in claim 3, wherein each of said pixels comprises at least one primary color sub-pixel.

5. The monolithic, or monolithic-like AMLCD as recited in claim 4, wherein said primary color sub-pixel comprises red, green and blue sub-pixels.

6. The monolithic, or monolithic-like AMLCD as recited in claim 3, wherein said means for selectively altering said sub-pixel stimulation signals is adapted to reduce variations in luminance and chromaticity of said modified, transmitted light across a predetermined region of said display below a discernable threshold.

7. The monolithic, or monolithic-like AMLCD as recited in claim 6, wherein said variations in luminance and chromaticity of said modified, transmitted light comprise at least one from the group:

abrupt variations and gradual variations.

8. The monolithic, or monolithic-like AMLCD as recited in claim 7, wherein said means for selectively altering said sub-pixel stimulation signals is applied to individual sub-pixels.

9. The monolithic, or monolithic-like AMLCD as recited in claim 7, wherein said means for selectively altering said sub-pixel stimulation signals is applied to a predetermined subset of said sub-pixels.

10. The monolithic, or monolithic-like AMLCD as recited in claim 9, wherein said predetermined subset of said pixels comprises pixels having substantially identical light output characteristics.

11. The monolithic, or monolithic-like AMLCD as recited in claim 10, wherein said light output characteristics are described by effective T-V curves.

12. The monolithic, or monolithic-like AMLCD as recited in claim 9, wherein said means for selectively altering said sub-pixel stimulation signals is adapted to reduce variations in luminance and chromaticity in a predetermined subset of said pixels below a predetermined, discernable threshold.

13. The monolithic, or monolithic-like AMLCD as recited in claim 7, wherein said means for selectively altering said sub-pixel stimulation signals responsive to said non-uniformities comprises means for smoothing said sub-pixel stimulation signals, whereby abrupt variations are reduced to gradual variations below a predetermined perceptual threshold.

14. The monolithic, or monolithic-like AMLCD as recited in claim 13, wherein said achieved variation in luminance and chromaticity renders said non-uniformities visually imperceptible to a viewer at a predetermined position relative to said LCD and under predetermined viewing conditions.

15. A method for correcting luminance and chromaticity variations caused by non-uniformities in monolithic, or monolithic-like AMLCDs, having improved mechanical stiffness and controlled contrast, luminance and chromaticity across a wide range of view angles, and comprising a liquid crystal display element comprising pixels disposed in a two-dimensional array organized into rows and columns, each of said pixels comprising at least one sub-pixel, and support means comprising at least one from the group of cover plate and back plate affixed to and extending beyond said two-dimensional array of pixels, the steps comprising:

a) providing a display comprising pixels, said pixels being adapted to modify transmitted light upon stimulation by respective pixel stimulation signals;

b) mapping at least one region of said pixels, each of said pixels in said region having a similar effective T-V curve;

c) determining a transfer function for said mapped region to change one of said effective T-V curves to a predetermined, reference effective T-V curve; and d) applying an inverse of said transfer function to said pixel stimulation signals so that said pixels in said region appear to exhibit said predetermined, reference effective T-V curve.

16. The method for correcting luminance and chromaticity variations in monolithic, or monolithic-like AMLCDs as recited in claim 15, wherein said pixels comprise sub-pixels; said mapping step (a) comprises mapping regions of said sub-pixels, each having a similar effective T-V curve, said pixel stimulation signals comprising sub-pixel stimulation signals; and said applying an inverse transfer function step (c) further comprises applying an inverse of said transfer function to said sub-pixel stimulation signals.

17. The method for correcting luminance and chromaticity variations in monolithic, or monolithic-like AMLCDs as recited in claim 16, wherein said inverse transfer function comprises a look-up table.

18. The method for correcting luminance and chromaticity variations in monolithic, or monolithic-like AMLCDs as recited in claim 17, wherein said look-up table comprises at least one of the group of slope data and offset data.

19. The method for correcting luminance and chromaticity variations in monolithic, or monolithic-like AMLCDs as recited in claim 16, wherein said inverse transfer function comprises piece-wise interpolation.

20. The method for correcting luminance and chromaticity variations in monolithic, or monolithic-like AMLCDs as recited in claim 16, wherein said inverse transfer function is constructed using mathematical interpolation techniques based on at least one of:
   constants, slopes and higher-order terms.

21. The method for correcting luminance and chromaticity variations in monolithic, or monolithic-like AMLCDs as recited in claim 16, wherein said mapping step (b) comprises producing a contour map.

22. The method for correcting luminance and chromaticity variations in monolithic, or monolithic-like AMLCDs as recited in claim 21, wherein said contour map represents regions of sub-pixels each having a substantially identical effective T-V curve.

23. The method for correcting luminance and chromaticity variations in monolithic, or monolithic-like AMLCDs as recited in claim 22, wherein said mapping step (b) comprises the sub-steps of:
   i) measuring non-uniformities at a plurality of locations in said display; and
   ii) determining effective T-V curves representative of said measured mechanism responsible for said non-uniformities.

24. The method for correcting luminance and chromaticity variations in monolithic, or monolithic-like AMLCDs as recited in claim 22, wherein said determining transfer function step (c) comprises determining a transfer function for sub-pixels for a mapped region.

25. The method for correcting luminance and chromaticity variations in monolithic, or monolithic-like AMLCDs as recited in claim 24, wherein said transfer function is selectively applied to said sub-pixels dependent upon said primary colors thereof.

26. The method for correcting luminance and chromaticity variations in a monolithic, or monolithic-like, AMLCD in accordance with claim 15, wherein said non-uniformities are selected from the group of:
   electronic boundaries, lighting effects, birefringence, stress effects, temperature, ambient light, view angles, viewer preference, optical stack, mechanical deformation, and spacer balls.

27. A method for correcting luminance and chromaticity variations caused by optical aberrations or non-uniformities in monolithic, or monolithic-like AMLCDs, having improved mechanical stiffness and controlled contrast, luminance and chromaticity across a wide range of view angles, and comprising a liquid crystal display element comprising pixels disposed in a two-dimensional array organized into rows and columns, each of said pixels comprising at least one sub-pixel, and support means comprising at least one from the group of cover plate and back plate affixed to and extending beyond said two-dimensional array of pixels, the steps comprising:
   a) identifying an optical aberration affecting sub-pixels, each of said sub-pixels having an effective T-V curve associated therewith;
   b) determining a transfer function for said affected sub-pixels to change one of said effective T-V curves to a predetermined, reference effective T-V curve; and
   c) applying an inverse of said transfer function to said affected sub-pixels so that each pixel appears to have substantially said predetermined, reference effective T-V curve.

28. The method for correcting luminance and chromaticity variations in monolithic, or monolithic-like AMLCDs as recited in claim 27, wherein said inverse transfer function comprises a look-up table.

29. The method for correcting luminance and chromaticity variations in monolithic, or monolithic-like AMLCDs as recited in claim 28, wherein said look-up table comprises at least one of the group of slope data and offset data.

30. The method for correcting luminance and chromaticity variations in monolithic, or monolithic-like AMLCDs as recited in claim 29, the steps further comprising:
   (d) producing a contour map.

31. The method for correcting luminance and chromaticity variations in monolithic, or monolithic-like AMLCDs as recited in claim 30, wherein said contour map represents regions of sub-pixels each having a substantially identical effective T-V curve.

32. The method for correcting luminance and chromaticity variations in monolithic, or monolithic-like AMLCDs as recited in claim 31, wherein said producing a contour map step (d) comprises the sub-steps of:
   i) measuring variations of at least one of chromaticity and luminance caused by optical aberrations at a plurality of locations in said display; and
   ii) determining effective T-V curves representative, of sub-pixels at said plurality of locations.

33. A method for correcting luminance and chromaticity variations in monolithic, or monolithic-like AMLCDs as recited in claim 32, wherein said pixels comprise sub-pixels, each transmitting a predetermined, primary color.

34. A method for correcting luminance and chromaticity variations in monolithic, or monolithic-like AMLCDs as recited in claim 33, wherein said determining transfer function step (b) comprises determining a transfer function for sub-pixels for a mapped region dependent upon said primary color thereof.

35. A method for correcting luminance and chromaticity variations in monolithic, or monolithic-like AMLCDs as recited in claim 34, said transfer function is selectively applied to said sub-pixels dependent upon said primary colors thereof.

36. A method for producing a monolithic, or monolithic-like AMLCD having substantially uniform luminance and chromaticity, and having improved mechanical stiffness and controlled contrast, luminance and chromaticity across a wide range of view angles, and comprising a liquid crystal display element comprising pixels disposed in a two-dimensional array organized into rows and columns, each of said pixels comprising at least one sub-pixel, and support means comprising at least one from the group of cover plate and back plate affixed to and extending beyond said two-dimensional array of pixels, the steps comprising:
   a) providing a display having an array of pixels, said pixels comprising sub-pixels, each of said sub-pixels comprising a liquid crystal cell having a respective effective T-V curve;
   b) providing driver means for presenting sub-pixel stimulation signals to said sub-pixels, said driver means comprising a plurality of driver chips, each of said plurality of driver chips being operatively connected to a predetermined group of said sub-pixels;
   c) modifying the effective T-V curve of said sub-pixels and associated driver chips in a predetermined manner;
   d) adjusting the luminance and chromaticity of sub-pixels between regions of non-uniformity of said display to a predetermined level;
   e) adjusting the luminance and chromaticity of said sub-pixels within regions of non-uniformity substantially to said predetermined grey scale excitation level.

37. The method for producing a monolithic, or monolithic-like AMLCD as recited in claim 36, wherein said modifying step (c) comprises at least one from the operations of linearizing and creating a weighted responses.

38. The method for producing a monolithic, or monolithic-like AMLCD as recited in claim 36, wherein said adjusting step (e) comprises blending.

39. The method for producing a monolithic, or monolithic-like AMLCD display having substantially uniform luminance and chromaticity as recited in claim 38, wherein said predetermined level comprises a plurality of predetermined levels.

40. The method for producing a monolithic, or monolithic-like AMLCD display having substantially uniform luminance and chromaticity as recited in claim 39, wherein said blending process results in luminance and chromaticity variations below a predetermined perceptual threshold.

41. The method for producing a monolithic, or monolithic-like AMLCD as recited in claim 36, wherein said predetermined level comprises an externally chosen reference level.

42. The method for producing a monolithic, or monolithic-like AMLCD as recited in claim 36, wherein said predetermined level comprises a relative level dependant upon at least one operational parameter of said display.

43. The method for producing a monolithic, or monolithic-like AMLCD having substantially uniform luminance and chromaticity as recited in claim 36, wherein said driver chips comprise digital-to-analog converters (DACs) and said modifying step (c) comprises setting DAC voltage values at predetermined points in a non-linear response curve of said driver chips to provide an inverse response function of a response curve of said liquid crystal cell whereby said effective T-V curve associated with said liquid crystal cell is made substantially linear.

44. A method for producing a monolithic, or monolithic-like AMLCD having substantially uniform luminance and chromaticity and having improved mechanical stiffness and controlled contrast, luminance and chromaticity across a wide range of view angles, and comprising a liquid crystal display element comprising pixels disposed in a two-dimensional array organized into rows and columns, each of said pixels comprising at least one sub-pixel, and support means comprising at least one from the group of cover plate and back plate affixed to and extending beyond said two-dimensional array of pixels, the steps comprising:

a) providing a display comprising an array of pixels, said pixels comprising sub-pixels for transmitting a predetermined primary color upon application of a sub-pixel stimulation signal;

b) adjusting luminance and chromaticity of a first set of said sub-pixels to a first, predetermined level;

c) adjusting luminance and chromaticity of a second set of said sub-pixels to a second, predetermined level; and d) blending said first and said second predetermined levels to reduce differences in luminance and chromaticity below a predetermined perceptual threshold.

45. The method for producing a monolithic, or monolithic-like AMLCD having substantially uniform luminance and chromaticity as recited in claim 44, the steps further comprising:

e) adjusting luminance and chromaticity of said sub-pixels.

* * * * *